US011076434B2

(12) United States Patent
Sivavakeesar

(10) Patent No.: US 11,076,434 B2
(45) Date of Patent: Jul. 27, 2021

(54) COMMUNICATION SYSTEM SUPPORTING NETWORK SLICING

(71) Applicant: NEC Corporation, Tokyo (JP)

(72) Inventor: Sivapathalingham Sivavakeesar, Milton Keynes (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/324,738

(22) PCT Filed: Aug. 10, 2017

(86) PCT No.: PCT/JP2017/029059
§ 371 (c)(1),
(2) Date: Feb. 11, 2019

(87) PCT Pub. No.: WO2018/030508
PCT Pub. Date: Feb. 15, 2018

(65) Prior Publication Data
US 2019/0174561 A1 Jun. 6, 2019

(30) Foreign Application Priority Data
Aug. 12, 2016 (GB) .................................. 1613899

(51) Int. Cl.
*H04W 76/10* (2018.01)
*H04W 48/12* (2009.01)
*H04W 84/04* (2009.01)

(52) U.S. Cl.
CPC .......... *H04W 76/10* (2018.02); *H04W 48/12* (2013.01); *H04W 84/042* (2013.01)

(58) Field of Classification Search
CPC .... H04W 48/12; H04W 76/10; H04W 84/042
See application file for complete search history.

(56) References Cited

U.S. PATENT DOCUMENTS

2015/0358399 A1  12/2015  Baugher et al.
2016/0073327 A1   3/2016  Clougherty et al.
(Continued)

FOREIGN PATENT DOCUMENTS

CN    101772113 A    7/2010
CN    102165804 A    8/2011
(Continued)

OTHER PUBLICATIONS

"3rd Generation Partnership Project; Technical Specification Group Services and System Aspects; Study on Architecture for Next Generation System (Release 14)", 3GPP TR 23.799 V0.7.0, Aug. 2016, pp. 1-322.
(Continued)

*Primary Examiner* — Kashif Siddiqui
(74) *Attorney, Agent, or Firm* — Sughrue Mion, PLLC

(57) ABSTRACT

A communication system is disclosed in which a communication device forms part of a communication system in which network slicing is supported and in which at least one tenant is able to communicate using at least one slice type associated with that tenant. The communication device receives network slicing related information transmitted by a base station. The network slicing related information may comprise information identifying support for a tenant whose communication is supported via the base station, or a network slice type of a tenant that is supported by the base station. The network slicing related information may comprise information comprising at least one communication parameter that is associated with a specific tenant or a specific slice type of a specific tenant. The communication device uses a slice having a slice type of a tenant with which the communication device is associated, based on the network slicing related information.

4 Claims, 18 Drawing Sheets

(56) References Cited

U.S. PATENT DOCUMENTS

2018/0376364 A1* 12/2018 Keller ................. H04W 72/048
2019/0037409 A1* 1/2019 Wang .................... H04W 48/18

FOREIGN PATENT DOCUMENTS

| | | | |
|---|---|---|---|
| CN | 102421149 A | 4/2012 | |
| CN | 102104931 B | 5/2015 | |
| CN | 103096422 B | 7/2016 | |
| JP | 2013534087 A | 8/2013 | |
| JP | 2015195631 A | 11/2015 | |
| JP | 2019-525651 A | 9/2019 | |
| RU | 2480951 C2 | 4/2013 | |
| RU | 2551135 C2 | 5/2015 | |
| WO | 2015200106 A1 | 12/2015 | |
| WO | WO-2017171598 A1 * | 10/2017 | ........ H04W 36/0061 |

OTHER PUBLICATIONS

"Solution for key issue 17 on Network Discovery and Selection in idle mode", Qualcomm Incorporated, 3GPP SA WG2 Meeting #116; S2-163390, Jul. 11-15, 2016, pp. 1-10.

"Consideration on the System Information in NR", ZTE: 3GPP TSG-RAN WG2 Meeting #94, R2-163743, May 23-27, 2016, pp. 1-4.

"Consideration on RAN Side Network Slicing", ZTE, 3GPP TSG-RAN WG3 Meeting#91bis, R3-160821, Apr. 11-15, 2016, pp. 9.

"NGMN 5G White Paper", V1.0 by the Next Generation Mobile Networks (NGMN) Alliance, Feb. 17, 2015, pp. 1-125.

GB Search Report for 1613899.2 dated Feb. 1, 2017.

International Search Report for PCT/JP2017/029059 dated Jan. 17, 2018 (PCT/ISA/210).

Written Opinion for PCT/JP2017/029059 dated Jan. 17, 2018 (PCT/ISA/237).

"Solution for Network Slice Selection based on the NG UE's service context", Samsung, SA WG2 Meeting #115, S2-162622, May 23-27, 2016 (4 pages total).

Communication dated Jan. 28, 2020, from the Japanese Patent Office in application No. 2019-507356.

Communication dated Nov. 26, 2019 from the Russian Patent and Trademark office in application No. 2019106659.

Office Action dated Oct. 10, 2020 in Chinese Application No. 201780063043.6.

Samsung, "Inter-RAT mobility with LTE", 3GPP TSG-RAN WG2 Meeting #93bis, R2-162228, Dubrovnik, Croatia, Apr. 11-15, 2016 (3 pages total).

Samsung, "Network slicing selection", 3GPP TSG-RAN WG3 Meeting #92, R3-161065, Nanjing, China, May 23-27, 2016 (3 pages total).

Japanese Office Action for JP Application No. 2020-030125 dated Jun. 1, 2021 with English Translation.

* cited by examiner

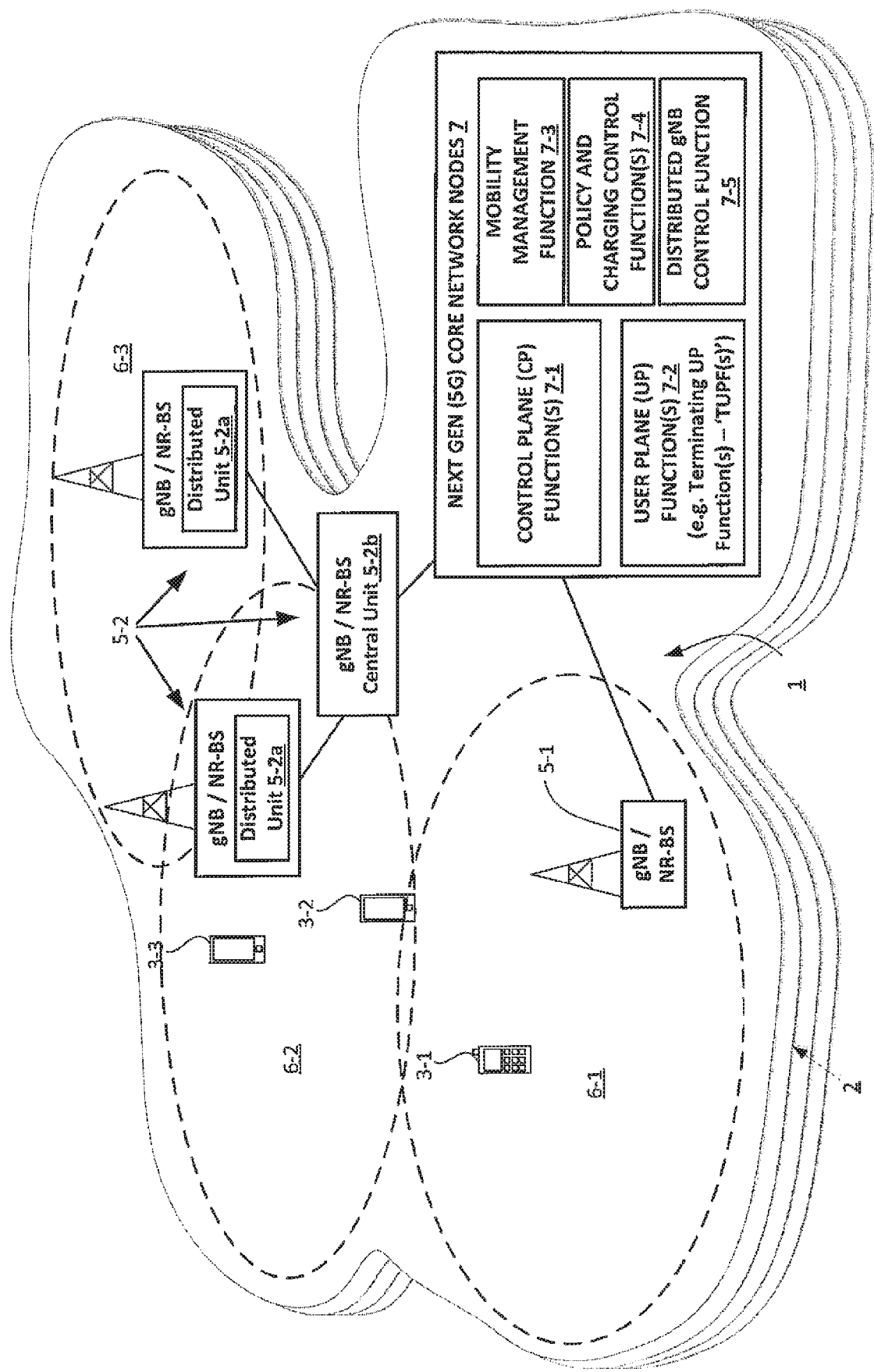
[Fig. 1]

[Fig. 2]
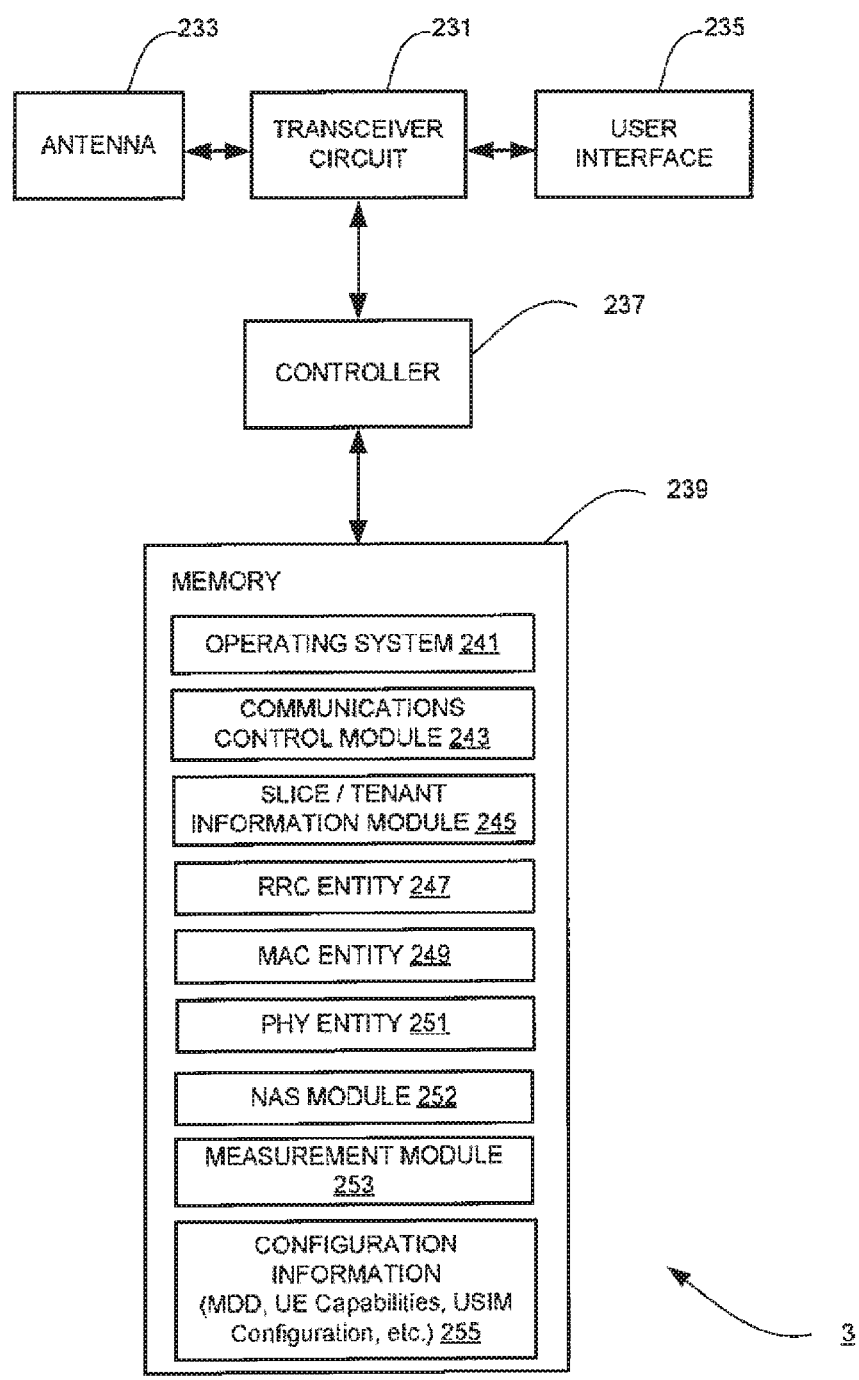

[Fig. 3]
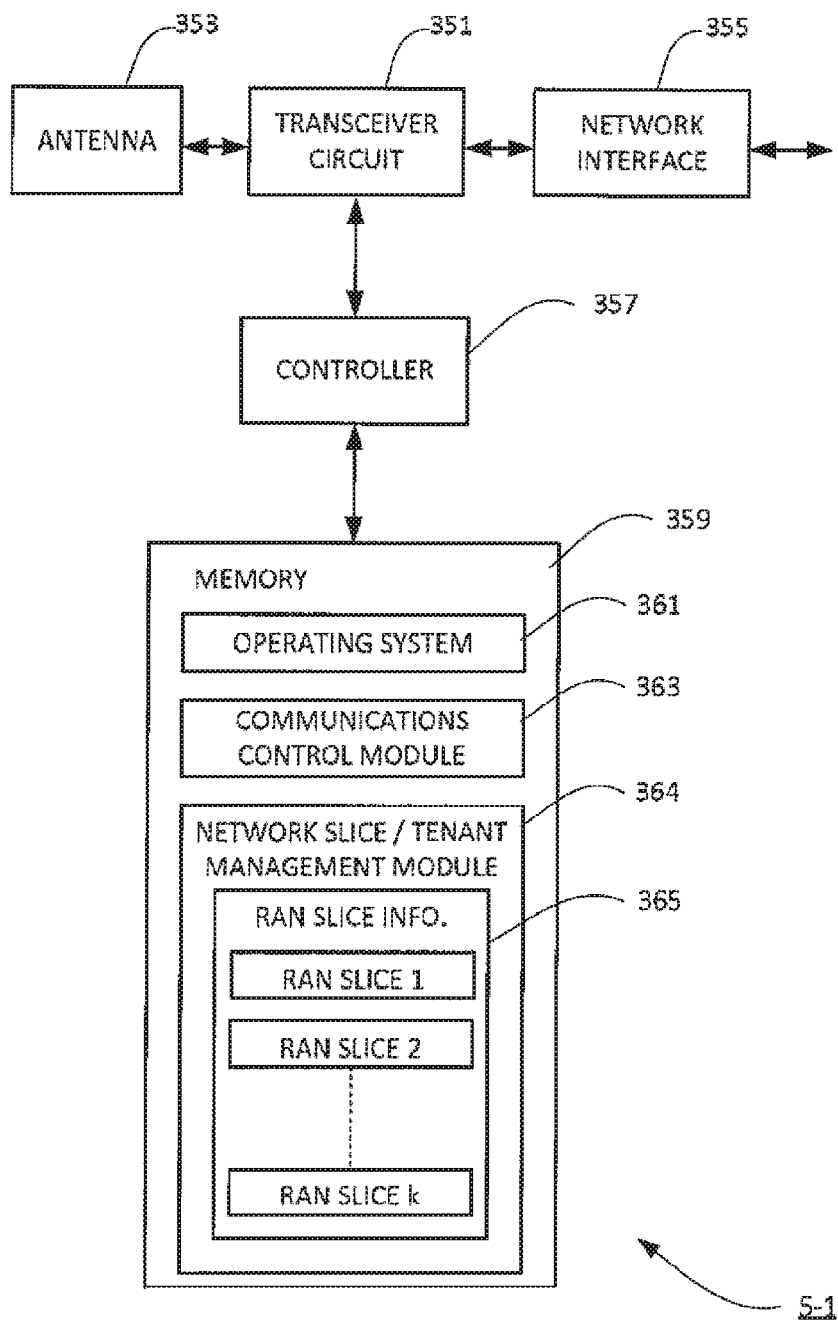

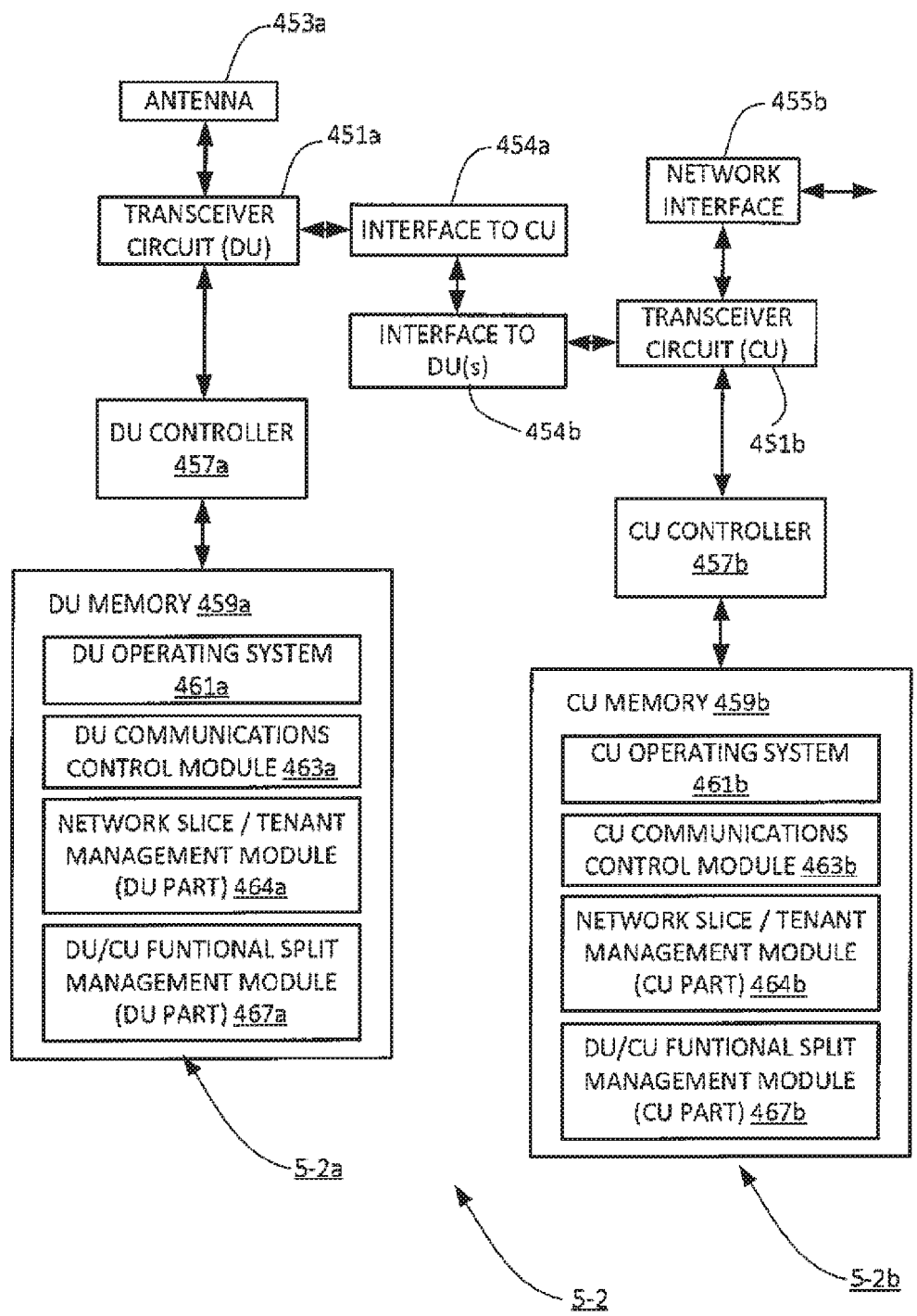
[Fig. 4]

[Fig. 5]
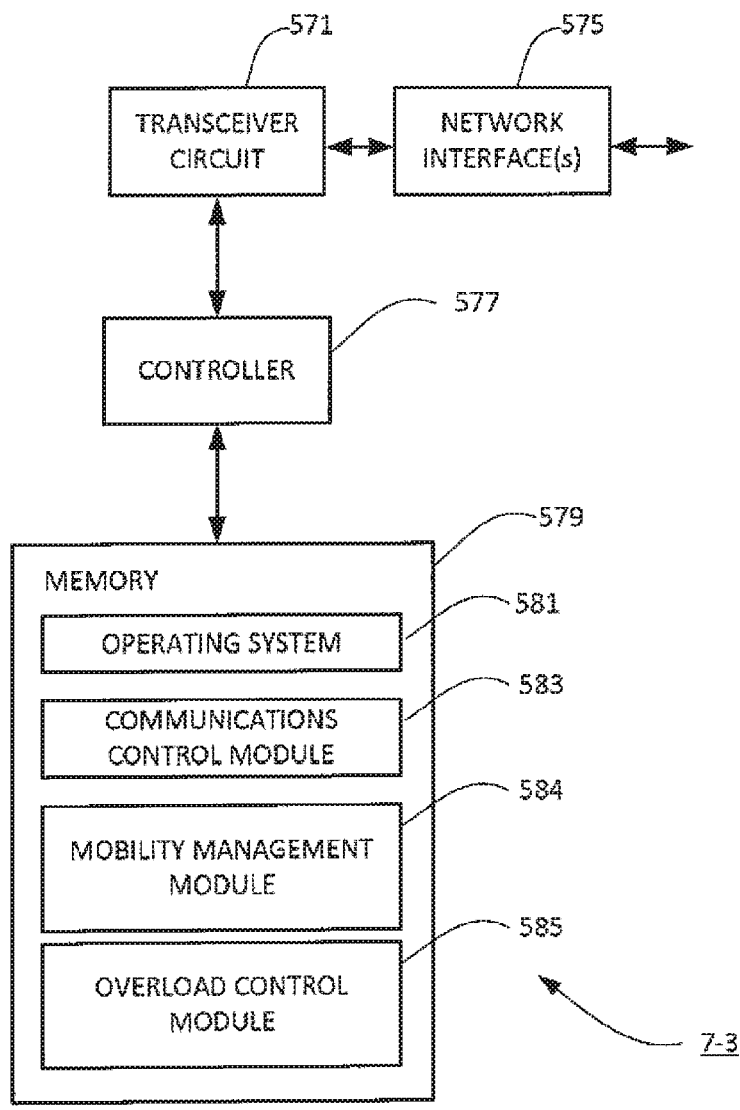

[Fig. 6]
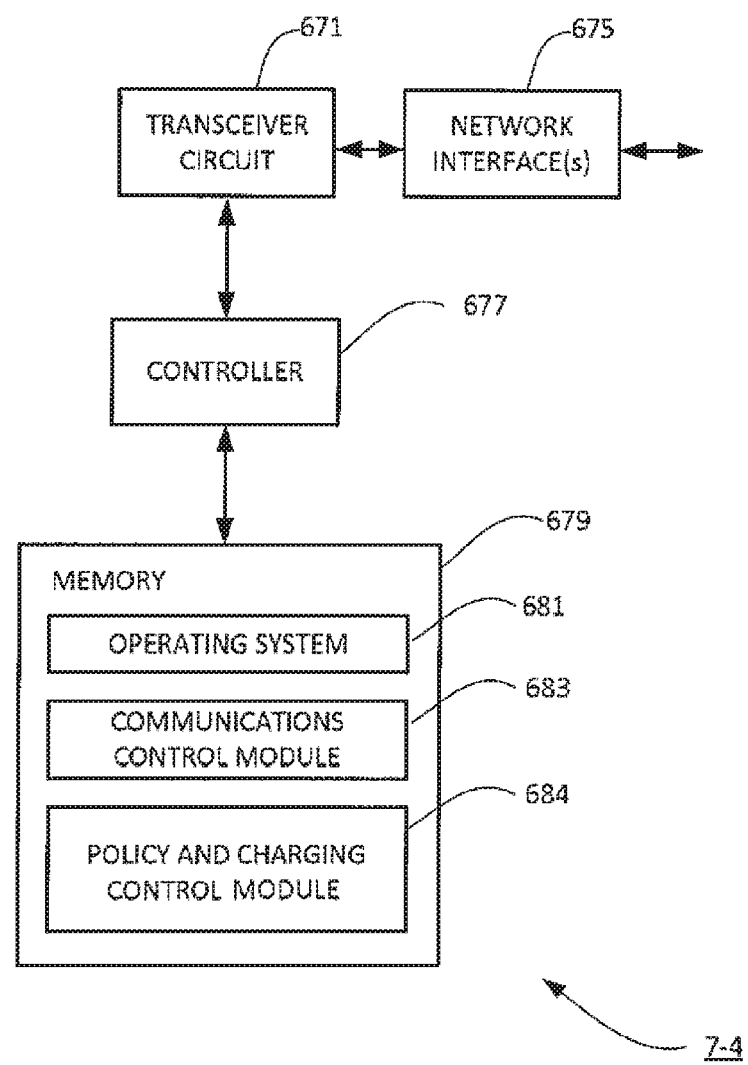

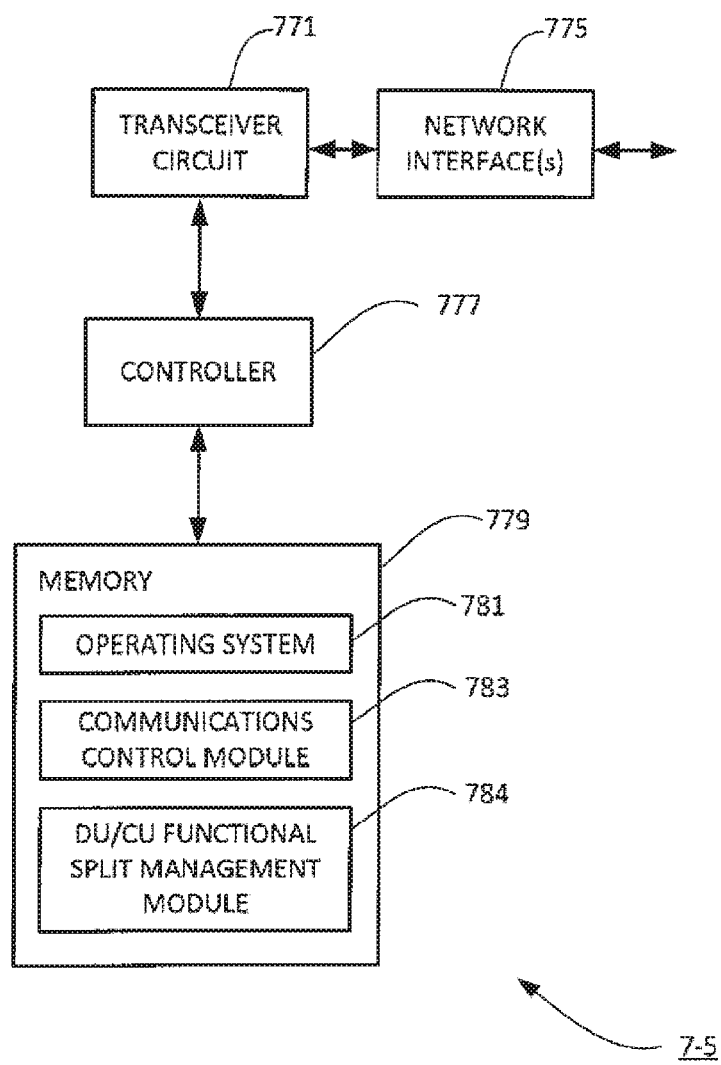
[Fig. 7]

[Fig. 8]
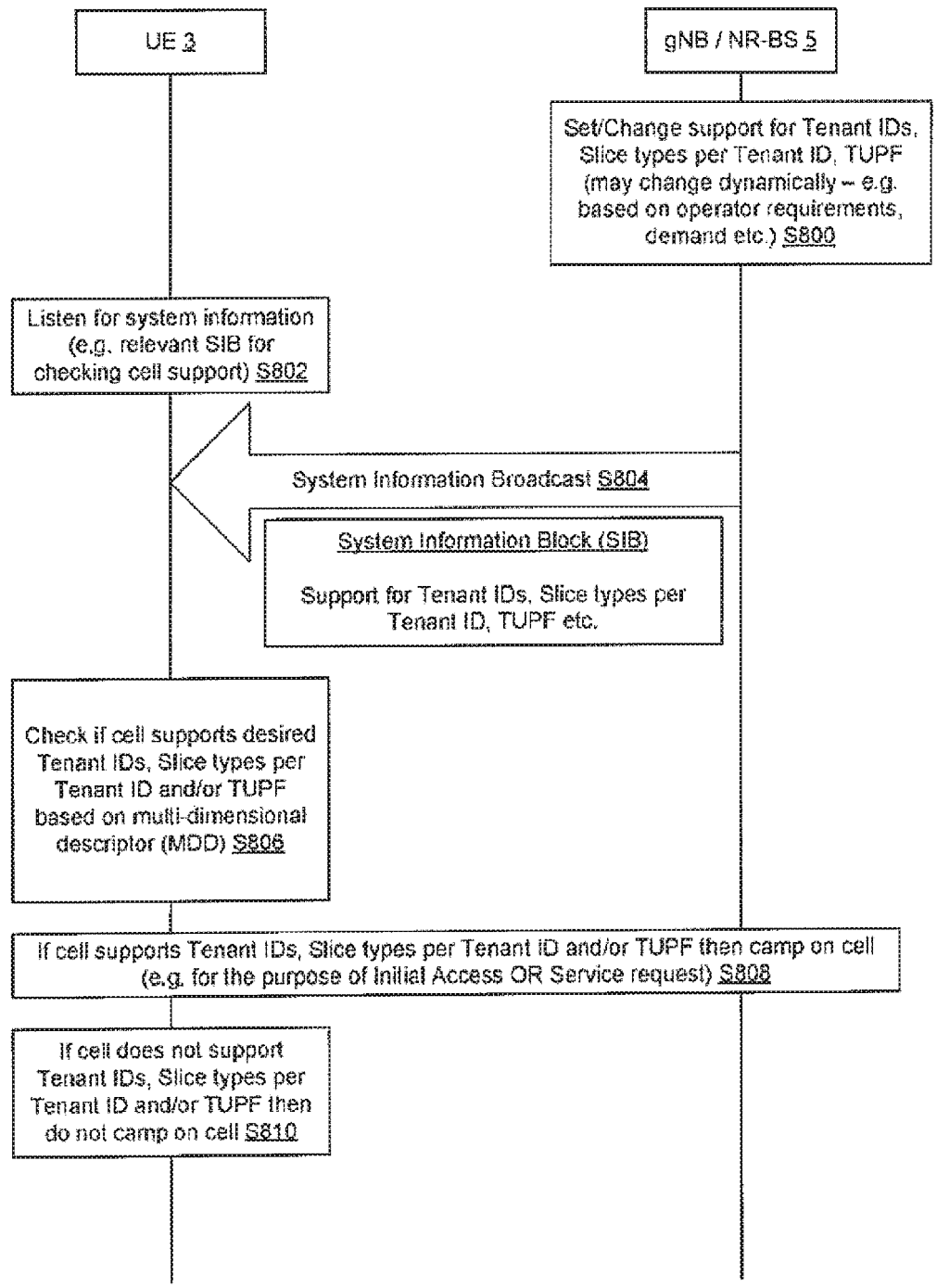

[Fig. 9]
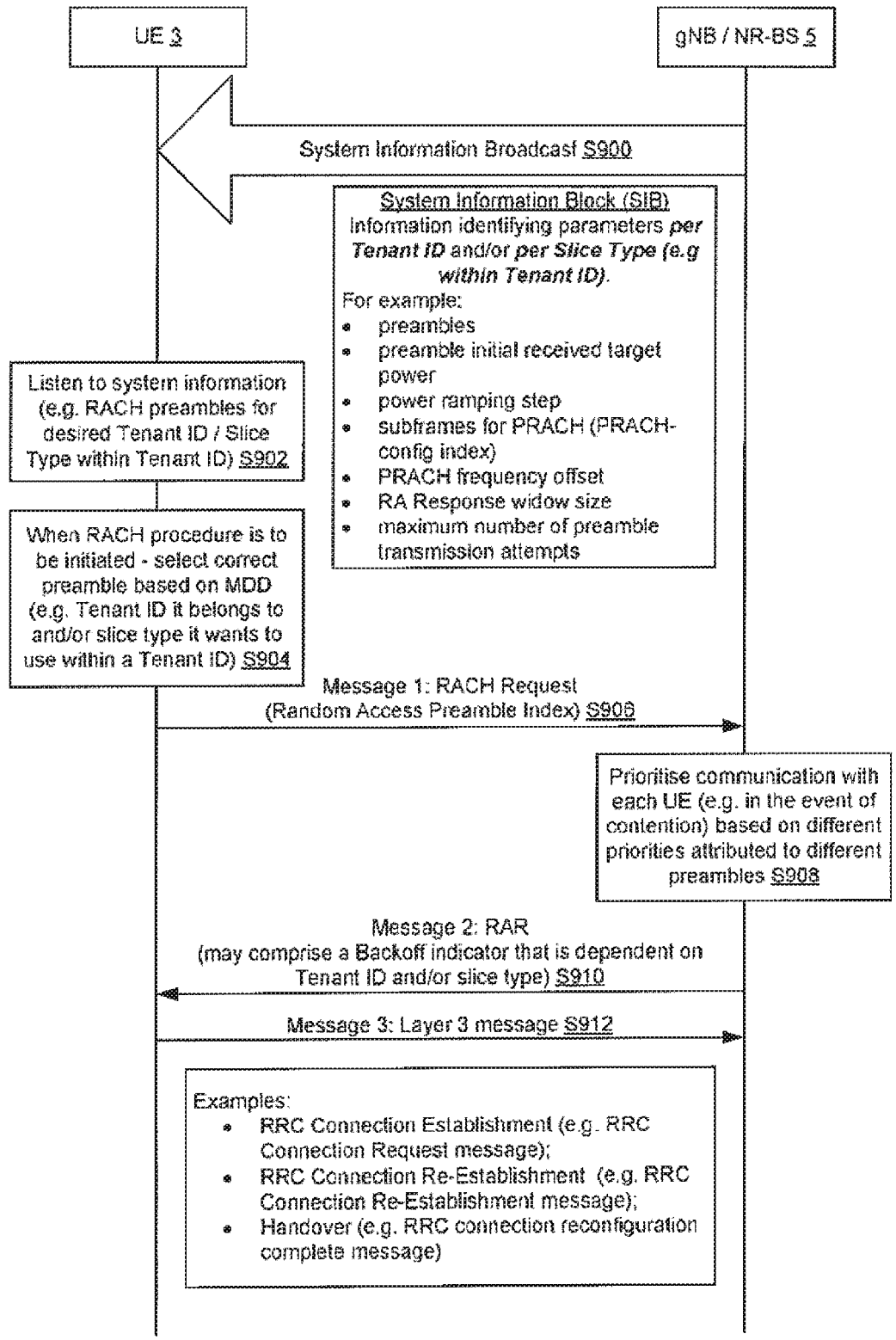

[Fig. 10]
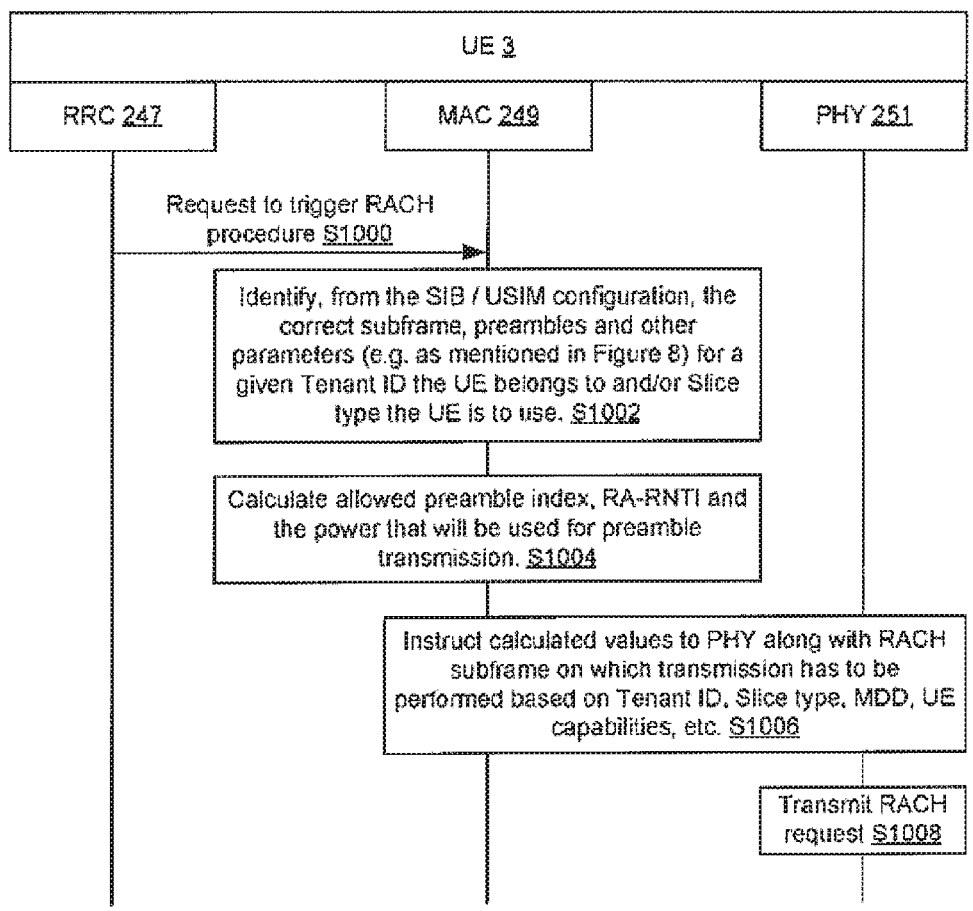

[Fig. 11]
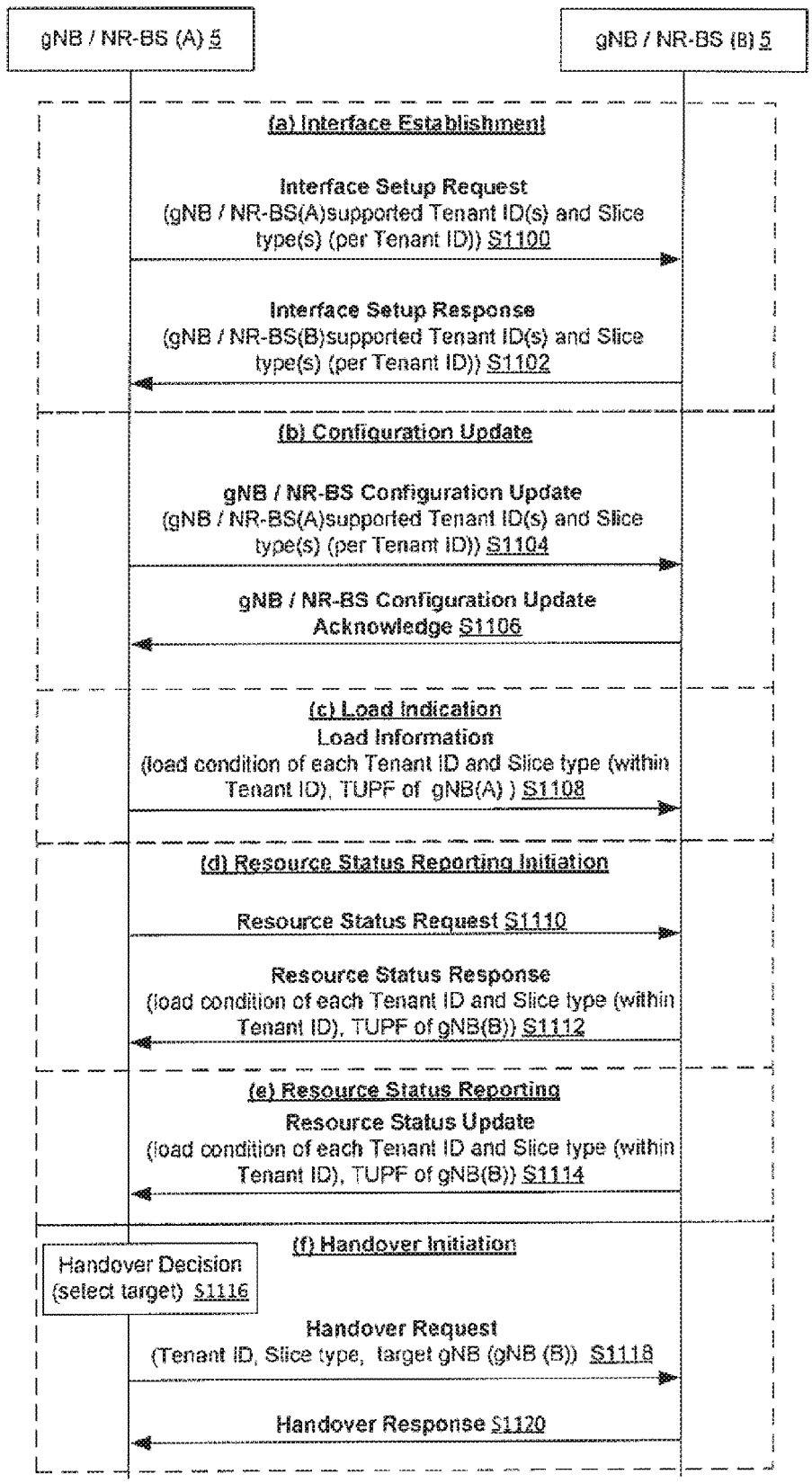

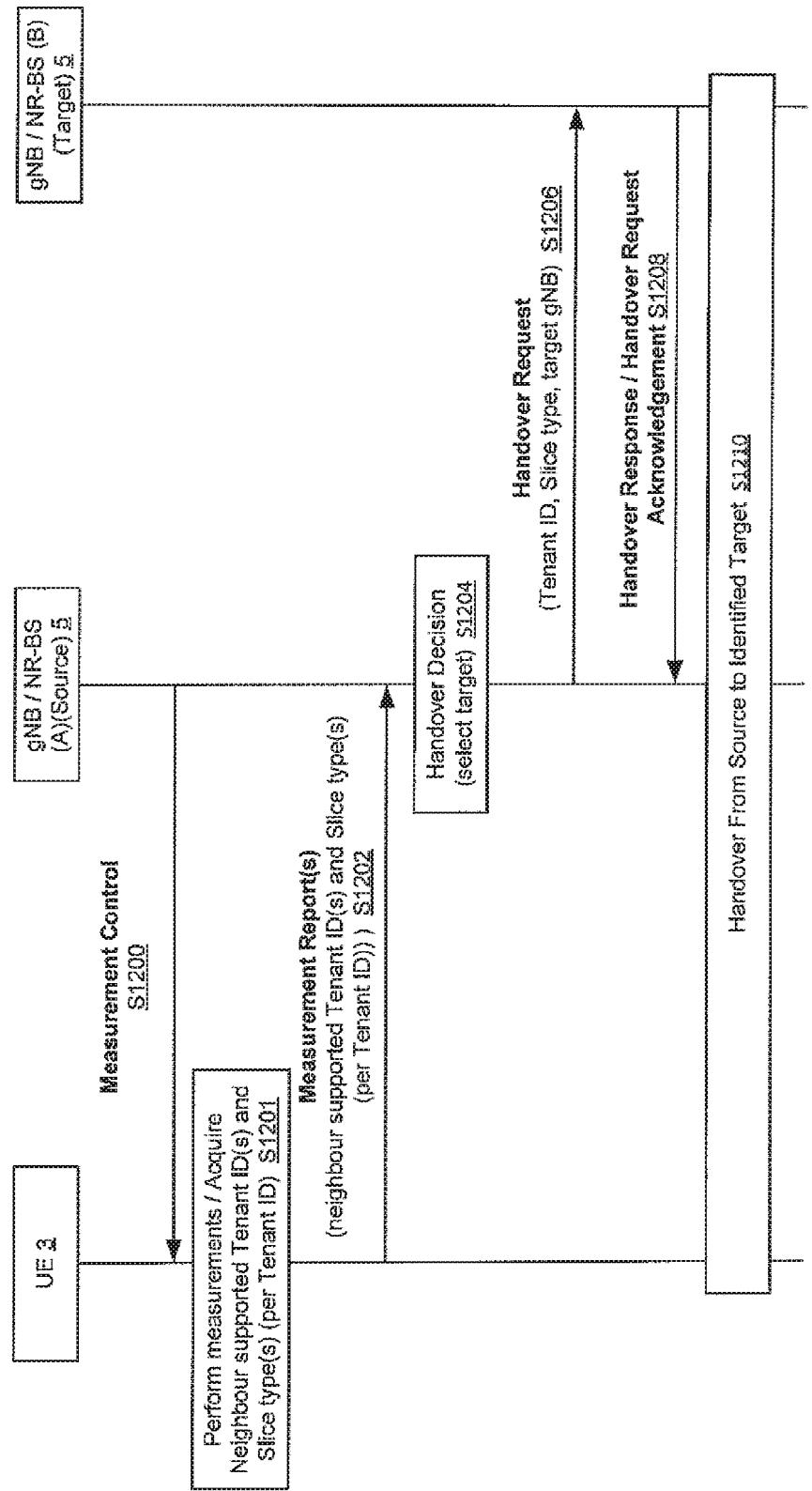
[Fig. 12]

[Fig. 13]
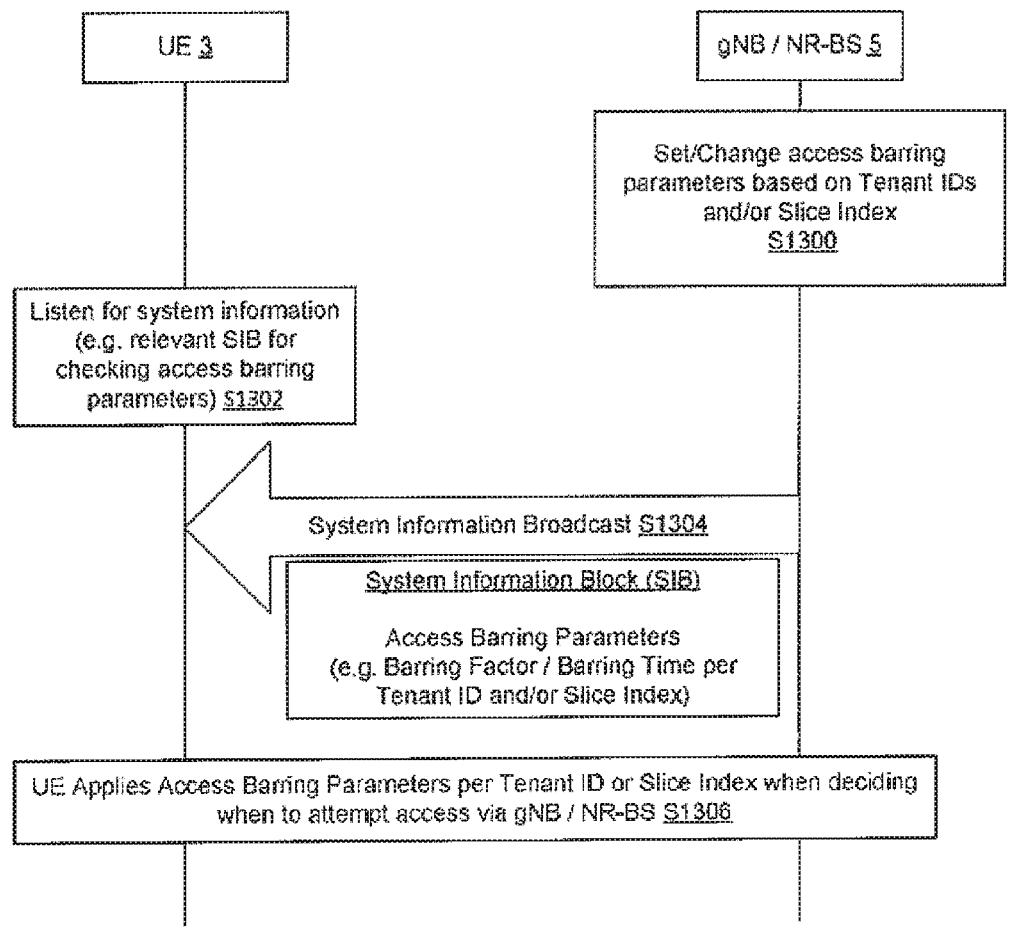

[Fig. 14]
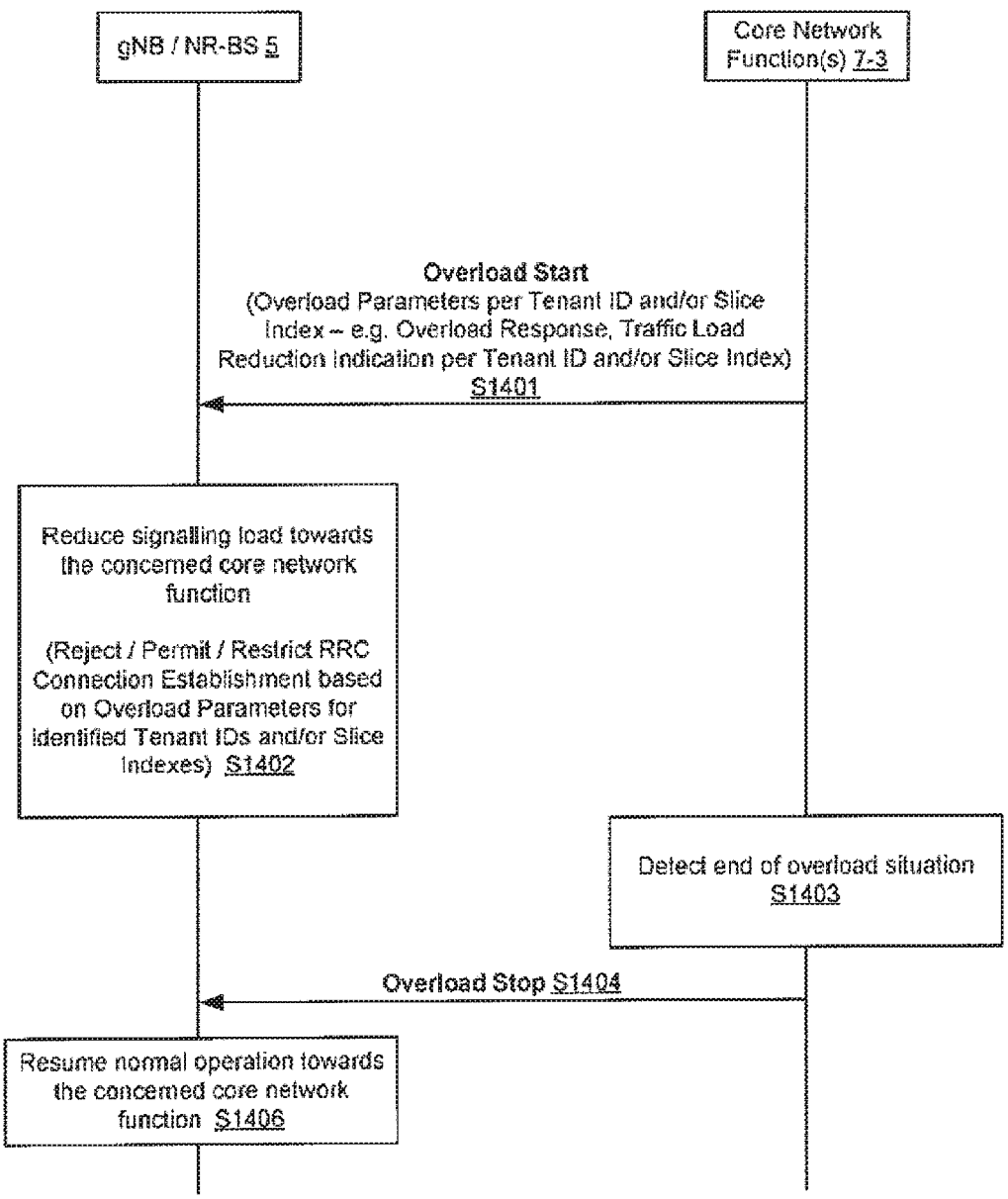

[Fig. 15]
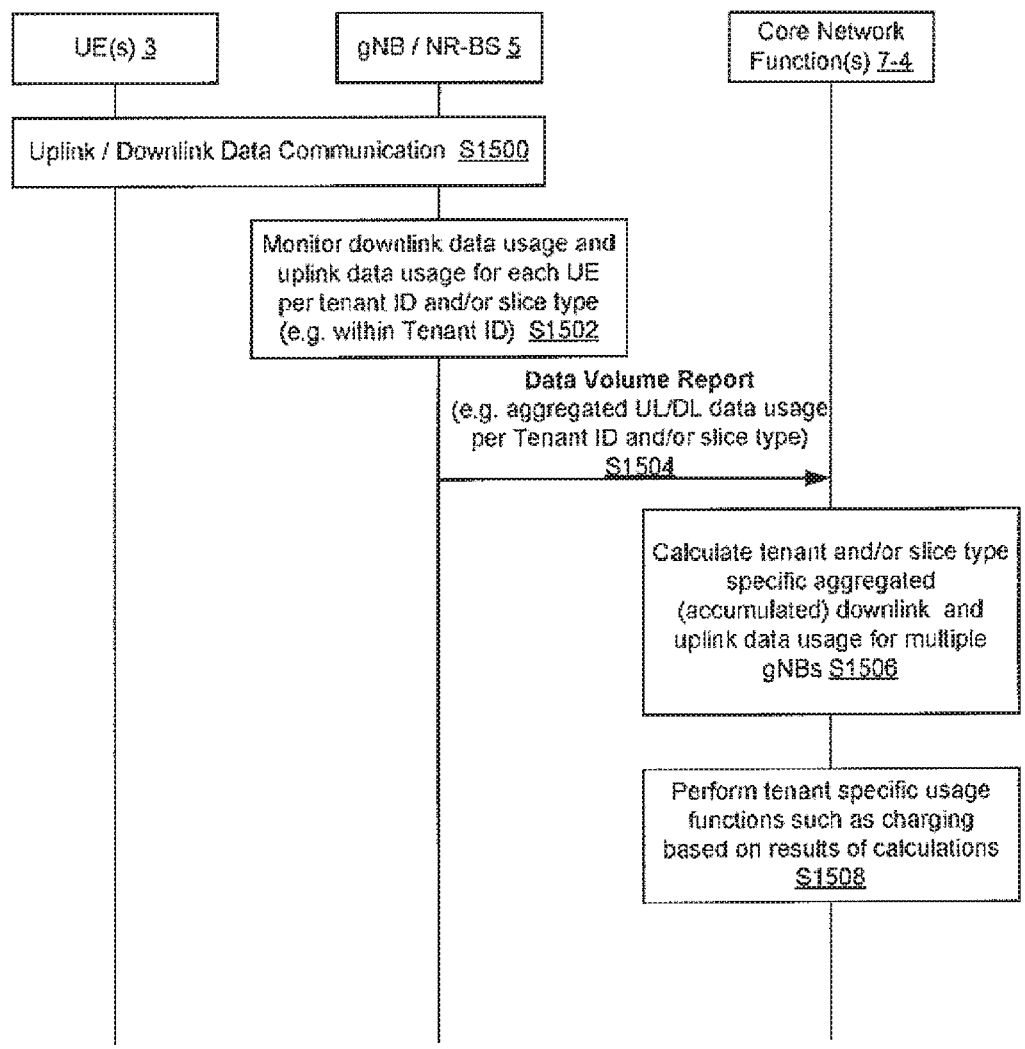

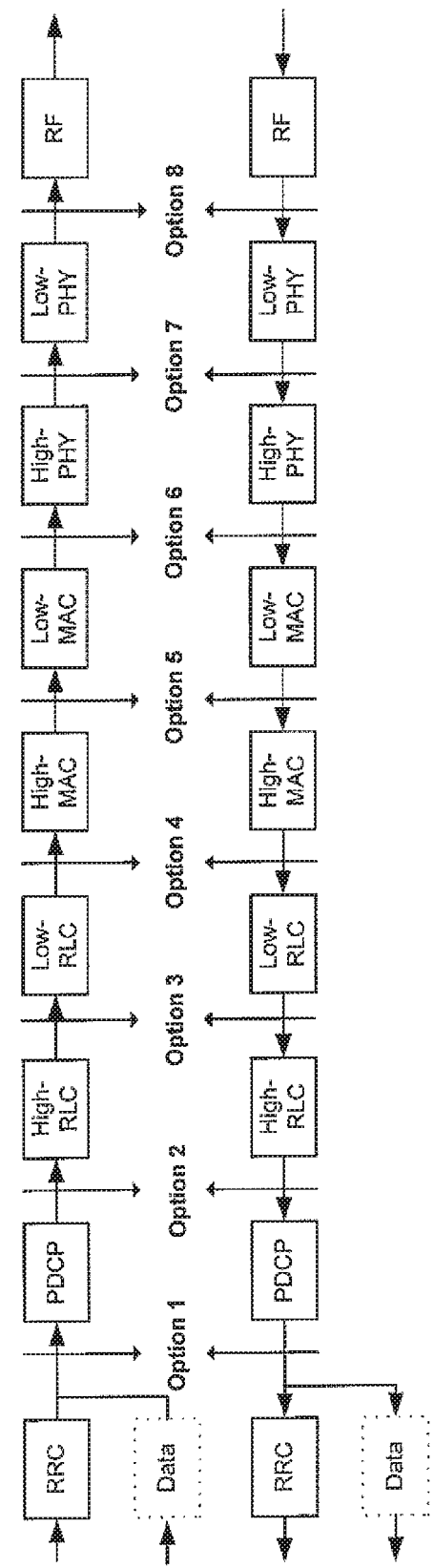
[Fig. 16]

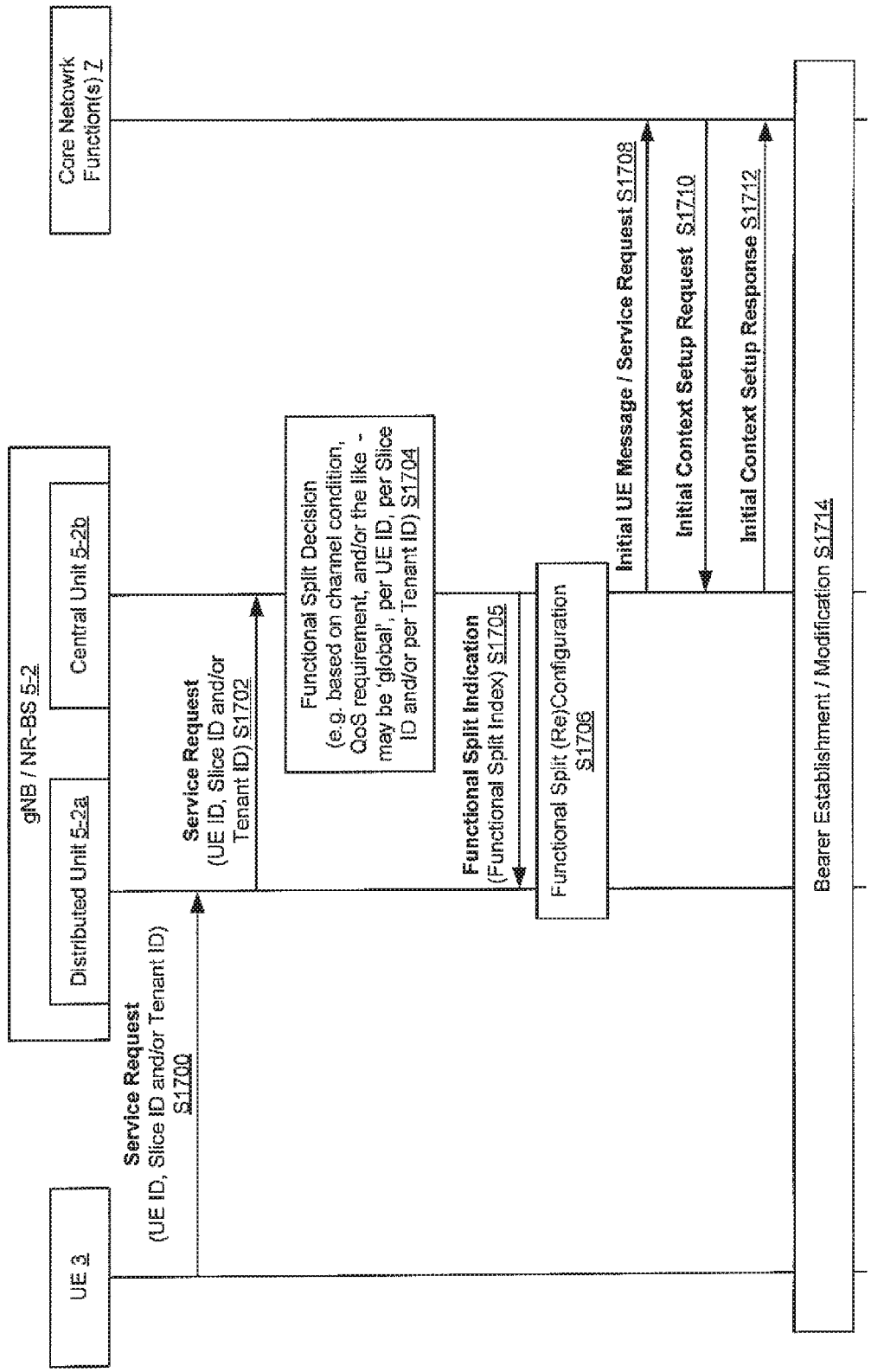
[Fig. 17]

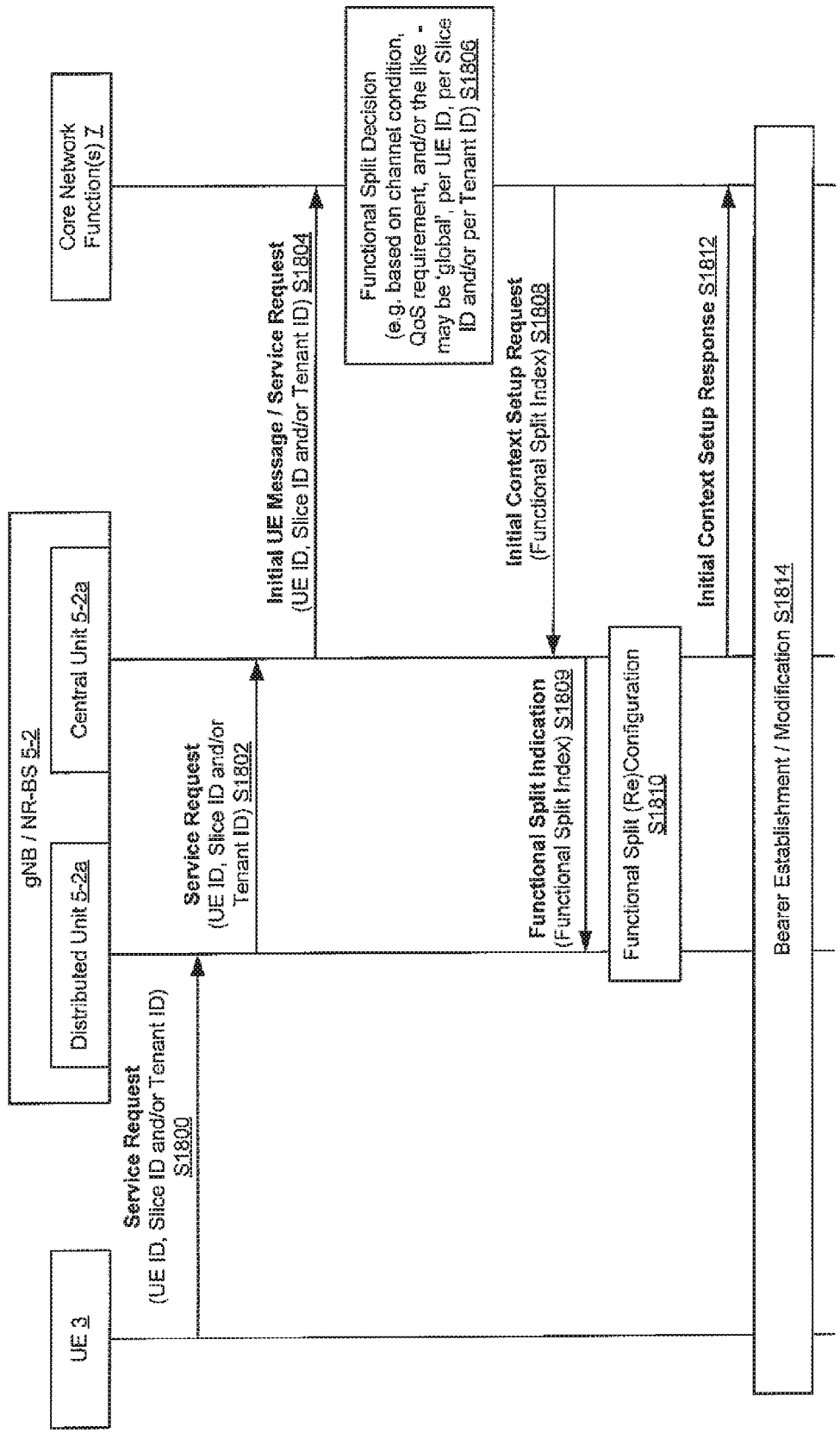

COMMUNICATION SYSTEM SUPPORTING NETWORK SLICING

TECHNICAL FIELD

The present invention relates to a radio access network in a cellular or wireless telecommunications network, and particularly but not exclusively to sharing the radio access network between multiple operators. The invention has particular but not exclusive relevance to wireless telecommunications networks implemented according to various standards defined by the 3rd Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into so called '5G' or 'new radio' (NR) technologies.

BACKGROUND ART

Radio Access Network (RAN) sharing deployment scenarios are known and methods and abilities to facilitate implementations of these scenarios have been introduced into the 3rd Generation Partnership Project (3GPP) standards since Release 5.

Traditionally, RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated, the on-going operating costs can be reduced for the sharing operators. Indeed, each base station may draw a large amount of electricity during operation, and therefore reducing the number of operating base stations may significantly reduce electrical power requirements and may therefore also be considered environmentally friendly.

Typically, sharing of RANs by operators has been a fixed long-term agreement in which each operator gets some access to the RAN of the other operator. RAN sharing is particularly advantageous in areas in which an operator has cell capacity that is underused, as this spare capacity can then be shared with no impact on the original operator's on-going service provision. Furthermore, RAN sharing may be useful in order to ensure that a service provided by an operator is able to reach a certain percentage of the population, which may be specified by license conditions in some countries, without requiring each operator to install expensive capacity in remote areas in which it is likely to be underutilized.

The terms '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G/NR technologies are expected to enable network access to vertical markets and support network (RAN) sharing for offering networking services to third parties and creating new business opportunities. Whilst a base station of a 5G/NR communication system is commonly referred to as a New Radio Base Station ('NR-BS') or as a 'gNB' it will be appreciated that they may be referred to using the term, eNB (or 5G/NR eNB) which is more typically associated with LTE base stations.

Recently, it has been proposed that the functionality of a gNB (referred to herein as a 'distributed' gNB) may be split between one or more distributed units (DUs) and a central unit (CU) with a CU typically performing higher level functions and communication with the next generation core and with the DU performing lower level functions and communication over an air interface with user equipment (UE) in the vicinity (i.e. in a cell operated by the gNB).

In order to support such a variety of applications and services, the mobile network operators must meet diverse, often conflicting requirements of these applications and need to handle high volumes of data traffic. For example, some of these applications may have relatively lenient Quality of Service/Quality of Experience (QoS/QoE) requirements, while some applications may have relatively stringent QoS/QoE requirements (e.g. high bandwidth and/or low latency).

As it would be expensive and unfeasible to deploy dedicated network infrastructure for each service or application type, network virtualization and 'network slicing' are seen as flexible and cost effective ways to support and accommodate heterogeneous applications with diverse demands over a common network infrastructure. Such network slicing is described in, for example, the 'NGMN 5G White Paper' V1.0 by the Next Generation Mobile Networks (NGMN) Alliance, which document is available from https://www.ngmn.org/5g-white-paper.html. Effectively, a network slice is a logical network, typically with respect to a particular service level agreement (SLA) for a specific tenant. A Tenant of a network (e.g. a public land mobile network (PLMN)) is a wholesale customer of the network. For instance, a tenant may be a big company, or an agency which requires a PLMN to provide at least access to a predefined set of resources, or some specific policies in handling its slices subscribers at times of congestion. An example of a tenant may include a public safety agency.

The tenant may also need application specific requirements. For instance in an enterprise deployment the enterprise may have a factory floor set of devices and devices that are associated to non-factory floor operations. The enterprise may have a policy to allocate at least 60% of resources (whether in the RAN or in the core) to factory floor operation at times of congestion but not to segregate resources at all times.

In more detail, a network slice (e.g. a "5G slice") may support a communication service, of a particular connection type, with a specific way of handling the controlplane and user-plane for that service. In effect, the slice can comprise a plurality of network functions and specific radio access technology (RAT) settings that are combined together for a specific use case, technical and/or business model. Slices need not contain all the same functions, and some functions that may, today, seem essential might even be missing in one or more slices. In essence, the intention is that a slice will provide only the traffic treatment that is necessary for a given use case, and thereby avoid other unnecessary functionality.

By way of example, multiple slices concurrently operating on the same infrastructure may include a slice for typical smartphone use that is configured by setting up fullyfledged smartphone dedicated functions distributed across the network. A slice supporting an automotive use case may also be provided in which security, reliability and latency are critical and for which all the necessary (and potentially dedicated) functions can be instantiated at a cloud edge node, including any vertical application made necessary as a result of latency constraints. Another slice supporting massive machine type (IoT) devices (e.g., sensors) may be provided with basic control-plane functions configured omitting, for example, any mobility functions, with contention based resources for the access. There may be other dedicated slices operating in parallel, and potentially a generic slice providing basic best-effort connectivity, to cope with unknown use cases and traffic.

Currently, it is envisaged that a number of key principles will likely need to be applied for support of Network Slicing in the RAN. Firstly, for example, the RAN will need an awareness of slices. Specifically, the RAN will support a differentiated handling of different network slices which have been pre-configured by the operator. The RAN will also likely support selection of the RAN part of the network slice by means of an identifier, such as a 'slice ID' provided by user equipment (UE), which unambiguously identifies one of the pre-configured network slices in the public land mobile network (PLMN). Similarly, the RAN will likely support: resource management between slices (e.g. policy enforcement between slices as per service level agreements); QoS differentiation within a slice; and/or resource isolation between slices. The RAN will also likely support RAN selection of a core network (CN) entity, for example for initial routing of uplink messages based on received slice ID and a mapping in the RAN node (CN entity, slices supported). If no slice ID is received, the RAN may select the CN entity based on an NAS (Non Access Stratum) Node Selection Function (NNSF) like function, e.g. based on a UE temporary ID.

SUMMARY OF INVENTION

Technical Problem

However, there are currently no coherent views or decisions on a number of key issues. For example, currently there is no firm view on whether a few basic slices will be standardised with their corresponding network functions (e.g. enhanced Mobile Broadband (eMBB), Massive Machine Type Communication (MTC), and/or the like). Similarly, it is not clear how the UE will obtain an unambiguous slice ID. The ID could, for example, be sent to the UE by the CN after the CN has selected the slice (e.g. similar to a feature of an enhanced dedicated core (eDECOR)) or it could be preconfigured in the UE. It is also unclear whether resource isolation would mean that multiple slices cannot share control plane (respectively user plane) resources or processing resources in common and/or whether resource isolation would mean that some form of cryptographic functionality should be implemented to isolate control plane (CP) and user plane (UP) traffic between slices.

Moreover, there are a number RAN specific issues that will need to be addressed such as, for example: how the RAN verifies whether a particular UE is authorised to select a slice and when this verification happens; whether or not the RAN may also select the slice based on specific resources accessed by the UE; whether the RAN, or some other entity or group of entities, will handle the requirements coming from the service level agreements; whether or not the RAN should additionally support QoS enforcement independently per slice.

There are also many other issues, that have not yet been considered or recognised, which require addressing in order to provide a functional slicing mechanism.

It can be seen, therefore, that there are many issues that need to be addressed in order for significant progress to be made towards provision of a fully working and efficient slicing mechanism.

The present invention seeks to provide apparatus and associated methods that at least partially contribute to the provision of a working slicing mechanism by addressing one or more of these issues.

Notwithstanding the above recognised issues, the inventor has realised that progress can be made towards a working slicing mechanism if a number of as yet unconsidered issues are addressed.

Solution to Problem

With a view to providing such a mechanism, therefore, exemplary methods and apparatus described herein therefore seek to tackle or at least partially contribute to one or more of the following:
  allowing a particular UE to know, even as early as cell (re)selection, whether its allowed tenant ID(s) and/or slice type(s) are supported within a prospect cell;
  providing for differential prioritisation for tenants (as identified by a tenant IDs) and/or slice types even at the time of an initial random-access channel (RACH) access procedure;
  handling mobility in the context of network slicing—e.g. determination of a resource situation in a neighbouring gNB; identification of an appropriate target and preparing it for a handover procedure; determination of whether or not a potential target is overloaded for a given tenant ID and/or slice type;
  handling tenant and/or slice overload situations in a gNB;
  acquisition of usage measurements (e.g. per tenant ID, per Slice type, per radio access technology (RAT), per frequency, per technology and/o per Uplink/Downlink (UL/DL)) and the provision of tenant usage (e.g. per slice type) specific functions such as charging; and/or
  enabling slice type based dynamic configuration of the functional split between a CU and a DU of a distributed gNB.

In one aspect there is provided a communication device for a communication system in which network slicing is supported and in which at least one tenant is able to communicate using at least one slice type associated with that tenant, the communication device comprising: a controller and a transceiver; wherein the transceiver is configured to receive network slicing related information transmitted by a base station, wherein the network slicing related information comprises at least one of: (i) information identifying support for at least one of: a tenant whose communication is supported via the base station, and a network slice type of a tenant that is supported by the base station; (ii) information comprising at least one communication parameter that is associated with at least one of: a specific tenant, and a specific slice type of a specific tenant; and wherein the controller is configured to control communication, via the transceiver, using a slice having a slice type of a tenant with which the communication device is associated, based on information provided in the received network slicing related information that relates specifically to at least one of: the tenant with which the communication device is associated, and the slice type of the tenant with which the communication device is associated.

In another aspect there is provided a base station for a communication system in which network slicing is supported and in which at least one tenant is able to communicate using at least one slice type associated with that tenant, the base station comprising: a controller and a transceiver; wherein the controller is configured to generate network slicing related information for transmission by the transceiver, wherein the network slicing related information for transmission comprises at least one of: (i) information identifying support for at least one of: a tenant whose communication is supported via the base station, and a network slice type of a tenant that is supported by the base station; (ii) information comprising at least one communication parameter that is associated with at least one of: a specific tenant, and a specific slice type of a specific tenant; and wherein the transceiver is operable to transmit the network slicing related information generated by the controller to at least one of a further base station and a communication device.

In another aspect there is provided a communication device for a communication system in which network slicing is supported and in which at least one tenant is able to communicate using at least one slice type associated with that tenant, the communication device comprising: a controller and a transceiver; wherein the transceiver is configured to receive configuration information for configuring the communication device to acquire, from at least one neighbouring base station, information identifying support, by the at least one neighbouring base station, for at least one of: a tenant whose communication is supported via the base station, and a network slice type of a tenant that is supported by the base station; wherein the controller is configured to acquire, based on the configuration information, from the at least one neighbouring base station, the information identifying support, by the at least one neighbouring base station, for at least one of: a tenant whose communication is supported via the base station, and a network slice type of a tenant that is supported by the base station, and to generate a report including the acquired information; and wherein the transceiver is configured to send the report to at least one base station.

In another aspect there is provided a base station for a communication system in which network slicing is supported and in which at least one tenant is able to communicate using at least one slice type associated with that tenant, the base station comprising: a controller and a transceiver; wherein the transceiver is configured: to transmit, to a communication device, configuration information for configuring the communication device to acquire, from at least one neighbouring base station, information identifying support, by the at least one neighbouring base station, for at least one of: a tenant whose communication is supported via the base station, and a network slice type of a tenant that is supported by the base station; to receive, from the communication device, a report comprising information identifying support, by the at least one neighbouring base station, for at least one of: a tenant whose communication is supported via the base station, and a network slice type of a tenant that is supported by the base station; and to generate a report including the acquired information; and wherein the controller is configured to determine a target for handover based on the information identifying support provide in the received report.

In another aspect there is provided a base station for a communication system in which network slicing is supported and in which at least one tenant is able to communicate using at least one slice type associated with that tenant, the base station comprising: a controller and a transceiver; wherein the transceiver is configured to receive, from a core node, information indicating that an overload action should be started in respect of at least one of: at least one specific tenant, and at least one specific network slice type of a specific tenant; and wherein the controller is configured to control, based on the information indicating that an overload action should be started, communication in respect of the at least one of: at least one specific tenant, and at least one specific network slice type of a specific tenant.

In another aspect there is provided a core node for a communication system in which network slicing is supported and in which at least one tenant is able to communicate using at least one slice type associated with that tenant, the core node comprising: a controller and a transceiver; wherein the controller is configured to determine that an overload action should be started, in respect of at least one of: at least one specific tenant, and at least one specific network slice type of a specific tenant; and wherein the transceiver is configured to transmit, to a base station, information indicating that an overload action should be started in respect of the at least one of: at least one specific tenant, and at least one specific network slice type of a specific tenant.

In another aspect there is provided a base station for a communication system in which network slicing is supported and in which at least one tenant is able to communicate using at least one slice type associated with that tenant, the base station comprising: a controller and a transceiver; wherein the controller is configured to acquire data usage information for communication via the base station wherein the data usage information comprises separate respective data usage information for at least one of: each tenant for which communication via the base station occurs, and each network slice type of each tenant for which communication via the base station occurs; and wherein the transceiver is configured provide, to a core node, the acquired separate respective data usage information.

In another aspect there is provided base station apparatus for a communication system in which network slicing is supported and in which at least one tenant is able to communicate using at least one slice type associated with that tenant, the base station apparatus comprising: a distributed unit and a central unit, wherein each unit respectively comprises a controller and a transceiver; wherein the controller of the distributed unit is configured to provide lower layer functionality of the base station apparatus, relative to the central unit, and the controller of the central unit is configured to provide higher layer functionality of the base station apparatus, relative to the distributed unit; wherein there are a plurality of possible functional splits between the lower layer functionality provided by the distributed unit and the higher layer functionality provided by the central unit; and wherein the controller of the distributed unit and the controller of the central unit are configured to reconfigure dynamically the functional split between the lower layer functionality provided by the distributed unit and the higher layer functionality provided by the central unit from a first of the possible functional splits to a second of the possible functional splits.

In another aspect there is provided apparatus implementing the distributed unit of the base station apparatus.

In another aspect there is provided apparatus implementing the central unit of the base station apparatus.

In another aspect there is provided a core node for a communication system, the core node comprising: a controller and a transceiver; wherein the controller is configured to control communication with base station apparatus having a distributed unit and a central unit and in which the distributed unit provides lower layer functionality of the base station apparatus, relative to the central unit, and the central unit provides higher layer functionality of the base station apparatus, relative to the distributed unit; wherein the controller is configured to determine which of a plurality of possible functional splits should be used between the lower layer functionality provided by the distributed unit and the higher layer functionality provided by the central unit; and wherein the transceiver is configured to provide an indication of which of a plurality of possible functional splits should be used to the central unit of the base station apparatus.

In another aspect there is provided a method performed by a communication device in a communication system in which network slicing is supported and in which at least one tenant is able to communicate using at least one slice type associated with that tenant, the method comprising: receiving network slicing related information transmitted by a base station, wherein the network slicing related information comprises at least one of: (i) information identifying support for at least one of: a tenant whose communication is supported via the base station, and a network slice type of a tenant that is supported by the base station; (ii) information comprising at least one communication parameter that is associated with at least one of: a specific tenant, and a specific slice type of a specific tenant; and controlling communication using a slice having a slice type of a tenant with which the communication device is associated, based on information provided in the received network slicing related information that relates specifically to at least one of: the tenant with which the communication device is associated, and the slice type of the tenant with which the communication device is associated.

In another aspect there is provided a method performed by a base station in a communication system in which network slicing is supported and in which at least one tenant is able to communicate using at least one slice type associated with that tenant, the method comprising: generating network slicing related information for transmission by a transceiver, wherein the network slicing related information for transmission comprises at least one of: (i) information identifying support for at least one of: a tenant whose communication is supported via the base station, and a network slice type of a tenant that is supported by the base station; (ii) information comprising at least one communication parameter that is associated with at least one of: a specific tenant, and a specific slice type of a specific tenant; and transmitting the generated network slicing related information to at least one of a further base station and a communication device.

In another aspect there is provided a method performed by a communication device in a communication system in which network slicing is supported and in which at least one tenant is able to communicate using at least one slice type associated with that tenant, the method comprising: receiving configuration information for configuring the communication device to acquire, from at least one neighbouring base station, information identifying support, by the at least one neighbouring base station, for at least one of: a tenant whose communication is supported via the base station, and a network slice type of a tenant that is supported by the base station; acquiring, based on the configuration information, from the at least one neighbouring base station, the information identifying support, by the at least one neighbouring base station, for at least one of: a tenant whose communication is supported via the base station, and a network slice type of a tenant that is supported by the base station, and to generate a report including the acquired information; and sending the report to at least one base station.

In another aspect there is provided a method performed by a base station in a communication system in which network slicing is supported and in which at least one tenant is able to communicate using at least one slice type associated with that tenant, the method comprising: transmitting, to a communication device, configuration information for configuring the communication device to acquire, from at least one neighbouring base station, information identifying support, by the at least one neighbouring base station, for at least one of: a tenant whose communication is supported via the base station, and a network slice type of a tenant that is supported by the base station; receiving, from the communication device, a report comprising information identifying support, by the at least one neighbouring base station, for at least one of: a tenant whose communication is supported via the base station, and a network slice type of a tenant that is supported by the base station; and to generate a report including the acquired information; and determining a target for handover based on the information identifying support provided in the received report.

In another aspect there is provided a method performed by a base station in a communication system in which network slicing is supported and in which at least one tenant is able to communicate using at least one slice type associated with that tenant, the method comprising: receiving, from a core node, information indicating that an overload action should be started in respect of at least one of: at least one specific tenant, and at least one specific network slice type of a specific tenant; and controlling, based on the information indicating that an overload action should be started, communication in respect of the at least one of: at least one specific tenant, and at least one specific network slice type of a specific tenant.

In another aspect there is provided a method performed by a core node in a communication system in which network slicing is supported and in which at least one tenant is able to communicate using at least one slice type associated with that tenant, the method comprising: determining that an overload action should be started, in respect of at least one of: at least one specific tenant, and at least one specific network slice type of a specific tenant; and transmitting, to a base station, information indicating that an overload action should be started in respect of the at least one of: at least one specific tenant, and at least one specific network slice type of a specific tenant.

In another aspect there is provided a method performed by a base station in a communication system in which network slicing is supported and in which at least one tenant is able to communicate using at least one slice type associated with that tenant, the method comprising: acquiring data usage information for communication via the base station wherein the data usage information comprises separate respective data usage information for at least one of: each tenant for which communication via the base station occurs, and each network slice type of each tenant for which communication via the base station occurs; and providing, to a core node, the acquired separate respective data usage information.

In another aspect there is provided a method performed by base station apparatus for a communication system in which network slicing is supported and in which at least one tenant is able to communicate using at least one slice type associated with that tenant, and wherein the base station apparatus comprises a distributed unit and a central unit, the method comprising: providing, via the distributed unit, lower layer functionality of the base station apparatus, relative to the central unit, and providing, via the central unit, higher layer functionality of the base station apparatus, relative to the distributed unit, wherein there are a plurality of possible functional splits between the lower layer functionality provided by the distributed unit and the higher layer functionality provided by the central unit; and reconfiguring, dynamically, the functional split between the lower layer functionality provided by the distributed unit and the higher layer functionality provided by the central unit from a first of the possible functional splits to a second of the possible functional splits.

In another aspect there is provided a method performed by a core node for a communication system, the method comprising: communicating with base station apparatus having a distributed unit and a central unit and in which the distributed unit provides lower layer functionality of the base station apparatus, relative to the central unit, and the central unit provides higher layer functionality of the base station apparatus, relative to the distributed unit; determining which of a plurality of possible functional splits should be used between the lower layer functionality provided by the distributed unit and the higher layer functionality provided by the central unit; and providing an indication of which of a plurality of possible functional splits should be used to the central unit of the base station apparatus.

Aspects of the invention extend to corresponding systems, methods, and computer program products such as computer readable storage media having instructions stored thereon which are operable to program a programmable processor or system to carry out a method as described in the aspects and possibilities set out above or recited in the claims and/or to program a suitably adapted computer to provide the apparatus recited in any of the claims.

Each feature disclosed in this document (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described, by way of example, with reference to the accompanying drawings in which:

BRIEF DESCRIPTION OF DRAWINGS

FIG. 1 schematically illustrates a mobile telecommunication system of a type to which the invention is applicable;

FIG. 2 is a block diagram of physical apparatus for implementing a mobile telephone suitable for use in the telecommunications system of FIG. 1;

FIG. 3 is a block diagram of physical apparatus for implementing a base station suitable for use in the telecommunications system of FIG. 1;

FIG. 4 is a block diagram of physical apparatus for implementing a distributed base station suitable for use in the telecommunications system of FIG. 1;

FIG. 5 is a block diagram of physical apparatus for implementing a core network function suitable for supporting overload control in the telecommunications system of FIG. 1;

FIG. 6 is a block diagram of physical apparatus for implementing a core network function suitable for supporting facilitating provision of charging functions for use in the telecommunications system of FIG. 1;

FIG. 7 is a block diagram of physical apparatus for implementing a core network function suitable for supporting dynamic configuration of a functional split between a distributed unit and a central unit of a distributed base station of the type shown in the telecommunications system of FIG. 1;

FIG. 8 illustrates a procedure, that may be performed between a base station and user equipment of the telecommunications system of FIG. 1, for allowing user equipment to know support for tenant ID(s) and/or slice type(s) within a particular cell;

FIG. 9 illustrates a procedure, that may be performed between a base station and user equipment of the telecommunications system of FIG. 1, for providing differential prioritisation for tenants and/or slice types;

FIG. 10 illustrates a procedure, that may be performed internally between a radio resource control layer, a media access control layer, and a physical layer of user equipment of the telecommunications system of FIG. 1, when implementing the procedure of FIG. 9 or a similar procedure;

FIGS. 11(a) to (f) illustrate a number of procedures, that may be performed between base stations of the type shown in the telecommunications system of FIG. 1, for supporting mobility in the context of network slicing;

FIG. 12 illustrates a procedure, that may be performed between user equipment and base stations of the type shown in the telecommunications system of FIG. 1, for supporting mobility in the context of network slicing;

FIG. 13 illustrates a procedure, that may be performed between user equipment and a base station of the type shown in the telecommunications system of FIG. 1, for facilitating the handling of congestion/overload situations in a gNB;

FIG. 14 illustrates a procedure, that may be performed between a base station and a core network function of the type shown in the telecommunications system of FIG. 1, for facilitating the handling of congestion/overload situations in a gNB;

FIG. 15 illustrates a procedure, that may be performed in the telecommunications system of FIG. 1, for facilitating provision of tenant usage (e.g. per slice type) specific functions such as charging;

FIG. 16 illustrates a number of different options for functional splits between a distributed unit and a central unit of a distributed base station of the type shown in the telecommunications system of FIG. 1;

FIG. 17 illustrates a procedure, that may be performed in the telecommunications system of FIG. 1, for facilitating dynamic configuration of a functional split between a distributed unit and a central unit of a distributed base station of the type shown in the telecommunications system of FIG. 1; and FIG. 18 illustrates another procedure, that may be performed in the telecommunications system of FIG. 1, for facilitating dynamic configuration of a functional split between a distributed unit and a central unit of a distributed base station of the type shown in the telecommunications system of FIG. 1.

DESCRIPTION OF EMBODIMENTS

Overview

FIG. 1 schematically illustrates a mobile (cellular) telecommunication system 1 in which a plurality of differently configured network slices 2 are defined via which a network operator provides cellular services to different tenants based on their SLA. It will be appreciated that with the concept of tenants, a network operator can differentiate different customer requirements and provide customised services using one/many slices. In this example, the mobile telecommunication system 1 operates as a next generation ('5G') system but it will be appreciated that many of the features described with reference to this example are applicable more widely in other communication systems. The base stations each form part of an associated radio access network (RAN) for allowing user equipment (UE) 3 (such as mobile telephones/smartphones 3-1, 3-2, and 3-3, MTC/IoT devices (not shown), and/or other mobile or fixed location communication devices) to connect to their network and receive one or more associated services.

Each UE 3, in this example, is provided with communication services by at least one tenant having its own unique tenant ID. Thus with tenant and slice concepts, the network operator is able to provide communication services using one or more types of network slice 2 depending on the communication requirements of the each tenant.

A multi-dimensional descriptor (MDD) is configured in each UE 3 which represents at least: a Tenant ID of a tenant it belongs to; and service descriptor/slice type they are entitled to use (governed partly by Tenant ID). The service descriptor/slice types may comprise standardised values and/or operator specific values. The MDD is, in essence, a matrix that indicates in each of its rows a slice 2 the UE 3 may request to access or address (hence if there is a single slice then the MDD is a vector). A row in the MDD is referred to as MDD vector.

Services are provided to each tenant's respective UE(s) 3 via one or more base stations 5-1, 5-2 of the telecommunication system 1. As will be understood by those skilled in the art, each base station 5 operates one or more cells 6-1, 6-2, 6-3 in which communications can be made between the base stations 5 and the UE(s) 3 using an appropriate radio access technology, for example, an Evolved Universal Terrestrial Radio Access (E-UTRA) technology and/or the like.

The base stations are configured to operate in accordance with next generation (5G) standards and, in this example, comprise a non-distributed type gNB 5-1 and a distributed gNB 5-2. As seen in FIG. 1 the distributed gNB 5-2 of this example comprises a central unit (CU) 5-2b and a plurality of distributed units (DU) 5-2a each serving at least one associated cell.

It will be appreciated that whilst, in this example, 'gNB' type base stations are described, it will be appreciated that much of the functionality can be extended to other base stations or similar apparatus for providing radio access to UEs 3 such as mobile (cellular) telephones/smartphones, MTC/IoT devices, and/or other mobile or fixed location communication devices.

The gNBs 5 are connected via an associated core network having a plurality of logical core network nodes 7 for supporting communication in the telecommunication system 1. The core network nodes 7 of this example implement, amongst other functions, at least one control plane function 7-1, at least one user plane function 7-2, and at least one policy and charging function 7-4. In this example one of the core network nodes 7 may also implement a mobility management function 7-3 which provides mobility management functionality, e.g. corresponding to that of an LTE mobility management entity (MME) or the like, which including core overload control. In this example one of the core network functions 7 may also comprise a function (referred to here as a 'distributed gNB control function' 7-5) for facilitating dynamic configuration of a functional split between the distributed units 5-2a and central unit 5-2b of the distributed gNB 5-2. It will be appreciated that whilst separate functions with specific names are described for illustrative purposes, the corresponding functionality may be implemented in isolation or combination by one or more suitable core network nodes 7 implemented using dedicated circuitry and/or software instructions for controlling an associated processor. For example the distributed gNB control function 7-5 may be implemented as part of any suitable core network node 7 such as a core node that implements mobility management functionality.

In this example the user plane function(s) 7-2 comprise at least one, but typically a plurality of, so-called terminating user plane function(s) (TUPF) for terminating user plane traffic and interfacing with a data network. By way of supporting background, 3GPP technical report (TR) 23.799 V0.7.0 introduces the concept of the TUPF which is effectively a logical network node coupled to one or more cells (gNBs). It is assumed that an appropriate protocol data unit (PDU) session is provided between the TUPF and each connected UE 3 (i.e. UEs served by base stations coupled to that TUPF).

Beneficially, to allow a particular UE 3 to know, as early as possible, whether that UE's allowed tenant ID(s) and/or slice type(s) are supported within a particular cell, information identifying the supported Tenant ID(s), slice type (per tenant ID) and TUPF 7-2 are, in one exemplary method, broadcast in system information (for example in a system information block, 'SIB', such as SIB2 in LTE) by the corresponding gNB 5. The UE 3 can then listen to the relevant SIB for the purpose of checking whether a given cell supports a particular desired tenant ID, slice type per Tenant ID and/or TUPF. Support for a particular desired tenant ID, slice type per Tenant ID and/or TUPF is checked based on the MDD, the UE capabilities and/or the USIM configuration.

When the UE 3 identifies that its desired Tenant IDs, Slice types per Tenant ID and TUPF are supported by a cell 6 based on the system information broadcast by the gNB 5, the UE 3 can then camp on the cell 6 for any of a number of different purposes (for example for an initial access procedures or requesting a service). A mobile network operator may support numerous tenants and slices—but a given cell does not have to broadcast all—but some depending on how a cell is configured based on local demand. Non-main tenant OR slices can be supported by miscellaneous tenant OR slice type.

Accordingly, a gNB 5 is advantageously able to dynamically change the tenant IDs, slice types per tenant ID and/or TUPF supported in a particular cell 6 (e.g. based on operator requirements, demand, or the like) and the UE 3 is able to efficiently identify whether its allowed tenant ID(s) and/or slice type(s) are supported within that cell 6.

Beneficially, in exemplary methods described in more detail later, the communication system illustrated in FIG. 1 provides procedures for supporting differential treatment and hence prioritisation of communication for different tenants and/or slice types. Specifically, in these exemplary procedures, system information relating to how a random access channel procedure is performed is provided on a per tenant Id and/or per slice type (for each tenant) basis. Hence, different respective configuration parameters can be provided for each respective tenant Id and/or per slice type (for each tenant). In one particularly beneficial example, the preambles used for the RACH procedure are, in effect, 'sliced' per tenant ID and/or slice type within tenant ID with, a different respective RACH preamble (or set of preambles) being associated with each tenant ID and/or each slice type associated with a particular tenant ID. Each of these RACH preambles (or set of preambles) is provided with a respective priority representing the priority with which the communication of the corresponding tenant and/or slice type should be treated. In other examples, the system information includes tenant/slice type specific parameters for configuring the power, frequency and/or relative timing used for transmitting a RACH request or repetitions of the RACH request.

Beneficially, in exemplary methods described in more detail later, the communication system illustrated in FIG. 1 provides a number of procedures, that may be performed between base stations of the type shown in the telecommunications system of FIG. 1, for supporting connected-mode mobility in the context of network slicing. The procedures include, various Inter-gNB tenant ID and slice type resource information exchange procedures for supporting handover decision making including procedures for allowing neighbouring gNBs 5 to know what tenant IDs and slice types are supported by each neighbour gNB 5 and procedures for allowing neighbouring gNBs 5 to know the load condition of each tenant, slice type (within tenant ID), and TUPF of each neighbour gNB 5.

Beneficially, in an exemplary method described in more detail later, the communication system illustrated in FIG. 1 provides support for supporting overload control by allowing access barring to be performed based on tenant ID and/or slice identity (index). Similarly, in another exemplary method described in more detail later, the communication system illustrated in FIG. 1 provides support for supporting overload control by allowing core network controlled overload procedure (overload start/stop procedures) to be targeted at one or more specific tenant IDs and/or slice identities.

Beneficially, therefore, to allow respective usage of each tenant to be taken into account for charging or other purposes, in one exemplary method, the communication system illustrated in FIG. 1 allows measurements to be taken for the purposes of calculating downlink and uplink data usage by each tenant in terms of slice types and other factors. Specifically, a number of new functions and counters are provided to enable aggregated downlink and uplink data volume collection per tenant ID, per slice type, per RAT (since 5G can support a variety of RATs such as a WLAN RAT etc.), per frequency, per technology (e.g. License Assisted Access (LAA) etc.), and/or per UL/DL. Each UE 3 will be identified, for the purposes of data volume collection, based on tenant ID and aggregation of downlink and uplink data consumption for UEs 3 identified via their tenant ID allows calculation of tenant specific data usage with a wide variety of granularity.

Moreover, given that 5G will support non-3GPP radio access technologies (e.g., IEEE 802.11, IEEE 802.15) in a seamless way, for 5G purposes the data volume calculations can beneficially also be performed on a per radio access technology for differentiated RAT based treatment (e.g. charging).

Beneficially, in exemplary methods described in more detail later, the communication system illustrated in FIG. 1 provides improved flexibility for the base station 5-2 that have central and distributed units by allowing the associated functional split to be changed dynamically to optimise the functional split based on channel conditions, load conditions and quality of service requirements may vary and/or the like.

User Equipment

FIG. 2 is a block diagram illustrating the main components of user equipment (such as a mobile telephone) 3 shown in FIG. 1. As shown, the UE 3 has a transceiver circuit 231 that is operable to transmit signals to and to receive signals from a base station (e.g. a gNB) 5 via one or more antenna 233. Although not necessarily shown in FIG. 2, the UE 3 may of course have all the usual functionality of a conventional UE 3 (such as a user interface 235) and this may be provided by any one or any combination of hardware, software and firmware, as appropriate. The UE 3 has a controller 237 to control the operation of the user equipment 3.

The controller 237 is associated with a memory 239 and is coupled to the transceiver circuit 231. Software may be pre-installed in the memory 239 and/or may be downloaded via the telecommunications network or from a removable data storage device (RMD), for example.

The controller 237 is configured to control overall operation of the UE 3 by, in this example, program instructions or software instructions stored within the memory 239. As shown, these software instructions include, among other things, an operating system 241, a communications control module 243, a slice/tenant information module 245, a radio resource control (RRC) entity 247, a medium access control (MAC) entity 249, a physical layer (PHY) entity 251, a non-access stratum (NAS) module 252, and a measurement module 253.

The memory also includes configuration information 255 used by the UE 3 for communication and control purposes. This information typically includes, amongst other things, the multi-dimensional descriptor (MDD) (when configured for the UE), information identifying the UE's communication and other capabilities and information identifying how the UE's subscriber identity module (SIM), for example a universal SIM (USIM) is configured.

The communications control module 243 is operable to control the communication between the UE 3 and the base stations 5. The communications control module 243 also controls the separate flows of uplink data and control data that are to be transmitted to the base station 5 and the reception of downlink data and control data transmitted by the base station(s) 5. The communications control module 243 is responsible, for example, for managing the UE's part in idle and connected mode procedures such as cell (re) selection, camping on cells, listening for system information, random access channel (RACH) procedures etc.

The slice/tenant information module 245 is responsible for managing and maintaining information identifying the tenant(s) to which the UE 3 belongs and the information identifying slice(s)/slice type(s) that the UE 3 is capable of using.

The RRC entity 247 is responsible for controlling the RRC layer functionality of the UE 3 (under the overall control of the communications control module 243). The MAC entity 249 is responsible for controlling the MAC layer functionality of the UE 3 (under the overall control of the communications control module 243). The PHY entity 251 is responsible for controlling the physical layer functionality of the UE 3 (under the overall control of the communications control module 243). The NAS module 252 is responsible for controlling the NAS functionality of the UE 3 (under the overall control of the communications control module 243).

The measurement module 253 handles the performance of measurements of communication conditions (e.g. received signal power and quality) in the serving and neighbouring cells (e.g. based on measurement configuration and control information received from the base station 5). The measurement module 253 also generates associate measurement reports for transmission to the base station 5.

Non-Distributed Base Station (gNB)

FIG. 3 is a block diagram illustrating the main components of a non-distributed type gNB 5-1 of the type shown in FIG. 1. As shown, the gNB 5-1 includes a transceiver circuit 351 which is operable to transmit signals to and to receive signals from UEs 3 via one or more antennae 353 and which is operable to transmit signals to and to receive signals from the functions of the core network 7 and/or other gNBs 5 via a network interface 355. The network interface 355 typically includes an S1-like interface for communicating with the core network and a gNB to gNB (e.g. X2-like) interface for communicating with other gNBs. A controller 357 controls the operation of the transceiver circuit 351 in accordance with software stored in a memory 359. The software includes, among other things, an operating system 361, a communications control module 363 and a network slice/tenant management module 364.

The communications control module 363 is operable to control the communication between the gNB 5-1 and the UEs 3 and other network entities that are connected to the gNB 5-1. The communications control module 363 also controls the separate flows of uplink and downlink user traffic and control data to be transmitted to the communications devices served by gNB 5-1 including, for example, control data for managing operation of the UEs 3. The communications control module 363 is responsible, for example, for controlling procedures such as the communication of measurement control/configuration information, system information, the gNBs part in random access channel (RACH) procedures etc. The communications control module 363 is also responsible for managing the gNBs part in the setup, configuration and reconfiguration of gNB to gNB interfaces with neighbouring gNBs. The communications control module 363 is also responsible for managing the gNBs part handover including making handover decisions, selecting targets etc. (where applicable). The communications control module 363 is also responsible for managing the gNBs part in overload/congestion control for example: the configuration/reconfiguration of access barring parameters; implementing and terminating core network initiated overload procedures; provision of load/congestion information to other nodes (e.g. other gNBs). The communications control module 363 is also responsible for monitoring and measuring UE data usage, for implementing associated counters and for providing the information to the core network.

The network slice/tenant management module 364 is operable to store and manage configuration data 365 for defining, for each service/tenant, the various radio access network (RAN) slices available via the gNB 5-1.

Distributed Base Station (gNB)

FIG. 4 is a block diagram illustrating the main components of a distributed type gNB 5-2 of the type shown in FIG. 1. As shown, the gNB 5-2 includes a distributed unit 5-2a and a central unit 5-2b. Each unit 5-2a, 5-2b includes a respective transceiver circuit 451a, 451b. The distributed unit 5-2a transceiver circuit 451a is operable to transmit signals to and to receive signals from UEs 3 via one or more antennae 453a and is operable to transmit signals to and to receive signals from the central unit 5-2b via an interface 454a.

The central unit 5-2b transceiver circuitry 451b is operable to transmit signals to and to receive signals from functions of the core network 7 and/or other gNBs 5 via a network interface 455b. The network interface 455b typically includes an S1-like interface for communicating with the core network and a gNB to gNB (e.g. X2-like) interface for communicating with other gNBs. The central unit 5-2b transceiver circuit 451b is also operable to transmit signals to and to receive signals from one or more distributed units 5-2b via an interface 454b.

Each unit 5-2a, 5-2b includes a respective controller 457a, 457b which controls the operation of the corresponding transceiver circuit 451a, 451b in accordance with software stored in the respective memories 459a and 459b of the distributed unit 5-2a and the central unit 5-2b. The software of each unit includes, among other things, a respective operating system 461a, 461b, a respective communications control module 463a, 463b, a respective network slice/tenant management module 464a, 464b, and a respective DU/CU functional split management module 467a, 467b.

Each communications control module 463a, 463b, is operable to control the communication of its corresponding unit 5-2a, 5-2b including the communication from one unit to the other. The communications control module 463a of the distributed unit 5-2a controls communication between the distributed unit 5-2a and the UEs 3, and the communications control module 463b of the central unit 5-2b controls communication between the central unit 5-2b and other network entities that are connected to the gNB 5-2.

The communications control modules 463a, 463b also respectively controls the part played by the distributed unit 5-2a and central unit 5-2b in the flow of uplink and downlink user traffic and control data to be transmitted to the communications devices served by gNB 5-2 including, for example, control data for managing operation of the UEs 3. Each communication control module 463a, 463b is responsible, for example, for controlling the respective part played by the distributed unit 5-2a and the central unit 5-2b in procedures such as the communication of measurement control/configuration information, system information, the gNBs part in random access channel (RACH) procedures etc. Each communication control module 463a, 463b is also responsible, for example, for controlling the respective part played by the distributed unit 5-2a and the central unit 5-2b in managing the gNBs part in the setup, configuration and reconfiguration of gNB to gNB interfaces with neighbouring gNBs. Each communication control module 463a, 463b is also responsible, for example, for controlling the respective part played by the distributed unit 5-2a and the central unit 5-2b in managing the gNBs part handover including making handover decisions, selecting targets etc. (where applicable). Each communication control module 463a, 463b is also responsible, for example, for controlling the respective part played by the distributed unit 5-2a and the central unit 5-2b in managing the gNBs part in overload/congestion control for example: the configuration/reconfiguration of access barring parameters; implementing and terminating core network initiated overload procedures; provision of load/congestion information to other nodes (e.g. other gNBs). Each communication control module 463a, 463b is also responsible, for example, for controlling the respective part played by the distributed unit 5-2a and the central unit 5-2b in monitoring and measuring UE data usage, for implementing associated counters and for providing the information to the core network.

Each network slice/tenant management module 464a, 464b is operable to perform the respective part played by the distributed unit 5-2a and the central unit 5-2b in storing and managing configuration data for defining, for each service/tenant, the various radio access network (RAN) slices available via the gNB 5-1.

Each DU/CU functional split management module 467a, 467b is responsible for the respective part played by the distributed unit 5-2a and the central unit 5-2b in managing, configuring, and reconfiguring the functional split between the distributed unit 5-2a and the central unit 5-2b.

Mobility Management Function

FIG. 5 is a block diagram illustrating the main components of a core node 7 that provides a mobility management function 7-3 (e.g. a mobility management entity (MME)). The core node 7-3 comprises a transceiver circuit 571 which is operable to transmit signals to and to receive signals from the gNBs 5 and/or other nodes (e.g. other core nodes providing other core network functions) via a network interface 575. A controller 577 controls the operation of the transceiver circuit 571 in accordance with software stored in a memory 579. The software includes, among other things, an operating system 581, a communications control module 583, a mobility management module 584 and an overload control module 585.

The communications control module 583 is operable to control direct and/or indirect communication between the core node 7-3 and other network entities (e.g. the gNBs and other core nodes providing other core network functions) that are connected (directly or indirectly) to the core node 7-3.

The mobility management module 584 is responsible for providing the mobility management functionality of the core node 7 including, for example, control for the access network, idle mode UE paging, bearer activation/deactivation functions, selection of an appropriate core node 7 (e.g. serving gateway and/or TUPF) for a UE at initial attach and at time of handover involving core node relocation. It is also responsible for authenticating a user, non-access stratum (NAS) signalling termination, generation and allocation of temporary identities to UEs and other such functions.

The overload control module 585 is responsible for managing overload situations in the core network at the core network node including detecting occurrence and ending of overload situations, transmission of messages for initiating and terminating overload actions at the gNB and/or the like.

Policy and Charging Control Function

FIG. 6 is a block diagram illustrating the main components of a core node 7 that provides a policy and charging control function 7-4. The core node 7-4 comprises a transceiver circuit 671 which is operable to transmit signals to and to receive signals from the gNBs 5 and/or other nodes (e.g. other core nodes providing other core network functions) via a network interface 675. A controller 677 controls the operation of the transceiver circuit 671 in accordance with software stored in a memory 679. The software includes, among other things, an operating system 681, a communications control module 683, and a policy and charging control module 684.

The communications control module 683 is operable to control direct and/or indirect communication between the core node 7-4 and other network entities (e.g. the gNBs and/or other core nodes providing other core network functions) that are connected (directly or indirectly) to the core node 7-4.

The policy and charging control module 684 is responsible for providing charging control functionality including the accumulation of data usage statistics, from multiple gNBs, for specific tenants and/or slice types. The policy and charging control module 684 performs charging functions based on the accumulated data usage statistics such as differential slice type based charging for each tenant.

DU/CU Functional Split Management Function

FIG. 7 is a block diagram illustrating the main components of a core node 7 that provides a DU/CU functional split management function 7-5 for providing core network based dynamic functional split management (if implemented) in distributed gNBs 5-2. The core node 7-5 comprises a transceiver circuit 771 which is operable to transmit signals to and to receive signals from the gNBs 5 and/or other nodes (e.g. other core nodes providing other core network functions) via a network interface 775. A controller 777 controls the operation of the transceiver circuit 771 in accordance with software stored in a memory 779. The software includes, among other things, an operating system 781, a communications control module 783, and a DU/CU functional split management module 784.

The communications control module 783 is operable to control direct and/or indirect communication between the core node 7-5 and other network entities (e.g. the gNBs and/or other core nodes providing other core network functions) that are connected (directly or indirectly) to the core node 7-5.

The DU/CU functional split management module 784 is responsible for providing management of the DU/CU functional split in a distributed gNB 5-2 of the type described with reference to FIG. 4. The DU/CU functional split management module 784 provides support for core network based dynamic functional split management (if implemented) including determining the optimum functional split for a given UE 3, tenant to which the UE 3 belongs and/or the slice the UE 3 wants to use. This determination will typically take account of prevailing channel conditions, load conditions and/or quality of service requirements.

In the above description, the mobile telephone, the UE, gNBs and core network nodes implementing the core network functions are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of procedures will now be described, by way of example only, which may be implemented to help provide an efficient slicing mechanism having a number of benefits. It will be appreciated that whilst each of these procedures may provide technical benefits independently when implemented in isolation, any combination of these procedures may be implemented together.

<Cell Support for Tenants and/or Slice Types Associated with a Tennant>

FIG. 8 illustrates a procedure, that may be performed between a base station and user equipment of the telecommunications system of FIG. 1, for allowing user equipment to know support for tenant ID(s) and/or slice type(s) within a particular cell.

As seen in FIG. 8, the illustrated procedure begins at S800 either: when a gNB 5 configures a cell to support one or more tenants (as represented by respective tenant identifiers), one or more specific slice types operated by one or more tenants and/or one or more TUPFs; or when the gNB 5 reconfigures a cell dynamically to change the supported tenant(s), specific slice type(s) operated by one or more tenants, and/or TUPF(s). It will be appreciated that support for tenant IDs, slice types per tenant ID, and/or TUPFs can be changed dynamically based on a number of different factors including, but not limited to, operator requirements and current, historic or predicted demand.

The gNB 5 regularly broadcasts system information into each cell that it operates in the form of a master information block (MIB) and a number of system information blocks (SIBs). Each SIB comprises information that a UE 3 may need to communicate in that cell and/or information that a UE 3 may acquire for provision to a neighbouring gNB 5 to inform the neighbouring gNB 5 about the gNB 5 performing the broadcast.

By way of example only, in long-term evolution (LTE) based communication systems (which the telecommunication system of FIG. 1 may be a development of): The MIB typically contains, inter alia, scheduling information on other SIBs; SIB1 typically contains, inter alia, cell access related information; SIB2 typically contains, inter alia, radio resource configuration information, barring information, and radio resource configuration of common channels; SIB3 typically contains, inter alia, cell-reselection information that is common for intra-frequency, inter-frequency and/or inter-RAT cell re-selection; SIB4 typically contains, inter alia, neighbour cell related information for intra-frequency cell re-selection, and an intra-frequency blacklisted cell list; SIB5 typically contains, inter alia, Evolved Universal Terrestrial Radio Access Network (E-UTRAN) specific interfrequency neighbouring cell related information, and a E-UTRAN specific inter-frequency blacklisted cell list; and SIB6 to SIB 7 typically contains, inter alia, information related to cell-reselection to radio access networks for different respective radio access technologies (e.g. UTRAN, GERAN, CDMA2000). It will be appreciated that this only represents a selection of such SIBs and that typically many other SIBs may be broadcast in a cell depending on technology and requirements.

In the procedure of FIG. 8, when the gNB 5 next broadcasts system information at S804, the system information includes a system information block (e.g. SIB2) that is configured to include information identifying the tenant IDs, slice types per tenant ID, and/or TUPF supported by the cell(s) operated by the gNB.

As seen at S802, the UE 3 listens for the regular broadcasts of system information provided from the gNB 5 and, accordingly, when the gNB 5 provides, at S804, the system information broadcast, the UE 3 receives the system information block including the information identifying the supported tenant IDs, slice types per tenant ID, and/or TUPF.

It will be appreciated that whilst shown at a particular point in the procedure illustrated in FIG. 8, a UE 3 listening for system information will be an ongoing process that the UE 3 will continue to do regularly whilst it is switched on.

Accordingly, at S806 the UE 3 is able to check whether or not the cell of the gNB supports its desired tenant ID(s), slice types per tenant ID, and/or TUPF. The UE 3 can check this based on: whether a particular tenant ID and/or slice (type) is represented in the multi-dimensional descriptor (MDD), UE capabilities, USIM configuration and/or dynamically NAS configured.

When the cell supports a tenant ID of the UE 3, and/or a specific slice type within the tenant ID that the UE 3 intends to use, then the UE 3 can make a decision to camp on that cell as indicated at S808.

It will appreciated that this procedure may be used by the UE 3 when deciding whether to camp in a given cell for any reason such as, for example, for the purposes of initial access to the network or for the purposes of making a service request.

When the cell does not support a tenant ID of the UE 3, and/or a specific slice type within the tenant ID that the UE 3 intends to use, then the UE 3 can make a decision not to camp on that cell as indicated at S810.

<Tenant/Slice Prioritisation>

FIG. 9 illustrates a procedure, that may be performed between a base station and user equipment of the telecommunications system of FIG. 1, for providing differential prioritisation for tenants and/or slice types early on during an attempt by a UE 3 to connect in a particular cell, at the time of a random access channel procedure.

As seen in FIG. 9, the illustrated procedure begins at S900 when system information is broadcast in a cell operated by the gNB 5 (e.g. as part of the regular broadcast of system information referred to with reference to FIG. 8). In the procedure of FIG. 9, when the gNB 5 broadcasts the system information at S900, the system information includes a system information block (e.g. SIB2) that is configured to include tenant ID specific parameters and/or slice type specific parameters. Different respective parameters may thus be configured for each tenant ID and/or each slice type associated with a particular tenant ID.

In this example, a different respective RACH preamble is associated with each tenant ID and/or each slice type associated with a particular tenant ID. In essence, therefore, the RACH preambles are 'sliced' per tenant ID and/or slice type within tenant ID. Each of these RACH preambles has a respective priority representing the priority with which the communication of the corresponding tenant and/or slice type should be treated.

The tenant ID specific parameters and/or slice type specific parameters provided in the system information at S900 include, in this example, parameters identifying the respective RACH preamble that is associated with each tenant ID and/or each slice type associated with a particular tenant ID.

As seen at S902, the UE 3 listens for the regular broadcasts of system information provided from the gNB 5 and, accordingly, when the gNB 5 provides, at S900, the system information broadcast, the UE 3 receives the system information block that includes the tenant ID specific parameters and/or slice type specific parameters.

It will be appreciated that whilst shown at a particular point in the procedure illustrated in FIG. 9, a UE 3 listening for system information will be an ongoing process that the UE 3 will continue to do regularly whilst it is switched on.

When the UE 3 determines that a RACH procedure needs to be initiated, (e.g. to facilitate initial access to the cell, connection establishment, handover, or the like) it identifies, at S904, the correct preamble to be used for the tenant ID it belongs to and/or slice type it intends to use. The identification can be based on the parameters, provided in the system information broadcast and/or parameters preconfigured in the USIM and/or MDD identifying the respective RACH preamble that is associated with each tenant ID and/or each slice type associated with a particular tenant ID in conjunction with the tenant ID(s) and/or associated slice type(s) represented in the multidimensional descriptor (MDD).

The UE 3 then generates Message 1 of the RACH procedure to request a random access channel (e.g. a RACH Request). The message includes information identifying the selected random access preamble (e.g. in the form of an index uniquely associated with the selected random access preamble). The message, including the information identifying the selected random access preamble, is sent to the gNB 5 at S906.

The gNB 3 determines a random access radio network temporary identity (RA-RNTI) associated with the UE 3 the time slot number in which the preamble is sent.

The gNB 5 then prioritises, at S908, communication with the UE 3 (e.g. compared to communication with other UEs) based on the preamble identified in message 1 of the RACH procedure and the relative priority associated with that preamble. In effect, therefore, the gNB 5 will treat different preambles with different priority when it receives RACH message 1.

After receiving RACH Request, the gNB allocates a temporary identity (temporary cell RNTI—TC-RNTI) to the UE 3 which is made permanent (as a C-RNTI) after a successful RACH procedure and calculates an appropriate timing advance to be used to ensure the next UE message will be sent and received at the correct timing. The gNB 5 also allocates uplink resources.

The gNB 5 generates an appropriate random access response (RAR) message (message 2) including the information required for UE 3 to send message 3 (e.g. a Layer 3 message such as an RRC Connection Request) at an appropriate time. This message is then sent to the UE 3 at S910. The RAR message is typically sent on a physical downlink control channel (PDCCH) within a time window of a few transmission time intervals (TTI). For the purposes of initial access, the RAR message will typically convey a random access preamble identifier, timing alignment information, initial UL grant, and assignment of a temporary C-RNTI.

It will be appreciated that whilst not shown in FIG. 9, if the UE 3 does not receive any RAR message from the network, it increases its power in fixed step and sends RACH preamble again.

The UE 3 responds to the RAR message, at S912, with an appropriate message 3 (e.g. an appropriate layer 3 message).

It will be appreciated that this tenant/slice type prioritisation supporting RACH procedure may occur during a number of different situations that could arise in the telecommunication system 1 of FIG. 1. The RACH procedure may be performed, for example: during an initial access procedure when the UE 3 is trying to access the network in an RRC idle state; during an RRC connection (re)establishment procedure; during a handover procedure; when uplink synchronization is lost (e.g. when the network has not received anything from a UE 3 in the uplink for a particular time duration); when a UE 3 does not have any physical uplink control channel (PUCCH) resources available for an SR (Scheduling Request); and when timing advance is needed for positioning purposes in RRC connected state for UE.

For example: when the RACH procedure is for the purposes of initial access (or RRC connection establishment), message 3 may be an RRC Connection Request message; when the RACH procedure is for the purposes of RRC Connection Re-Establishment, message 3 may be an RRC Connection Re-Establishment message; and when the RACH procedure is for the purposes of a handover type procedure requiring a RACH, message 3 may be an RRC connection reconfiguration complete message.

The RACH procedure, in this example, can also be used advantageously to provide a number other parameters on a per tenant and/or per slice type (for a particular tenant) basis in order to allow preferential, or differential treatment of communication for different tenants and/or slice types.

The following parameters may, for example, be provided on a per tenant ID/per slice type basis in the system information (e.g. in SIB2), in addition (or as an alternative) to the preamble information:

PreambleInitialReceivedTargetPower: This parameter represents a target power level that the gNB 5 would like to receive the first transmission of the RACH Request during the RACH procedure. The default value is typically −104 dBm but it may have values (typically) in the range −120 dBm to −90 dBm with step size of 2 dBm. This parameter may differ based on the tenant ID the UE 3 belongs to and/or slice type the UE 3 wants to use within a tenant ID.

PowerRampingStep: This parameter represents the power increments used by a UE 3 when transmitting each subsequent RACH request. This parameter may differ based on the tenant ID the UE 3 belongs to and/or slice type the UE 3 wants to use within a tenant ID so that different UEs belonging to different Tenant IDs (or using different slice types) can use different power steps to transmit subsequent RACH Request. A larger power ramping step can therefore be used to, in effect, make it more likely that a UE belonging to a particular Tenant IDs (or using a particular slice type) will have a subsequent RACH request received by the gNB 5 compared to a UE using a smaller power ramping step.

prach-ConfigIndex: This parameter defines exactly when UE should send (which subframes) a RACH in the frequency/time grids. This parameter may also differ based on the tenant ID the UE 3 belongs to and/or slice type the UE 3 wants to use within a tenant ID so that different UEs belonging to different Tenant IDs (or using different slice types) can use different subframes (e.g. 2 or 7) to transmit the RACH Requests.

prach-FreqOffset: The PRACH frequency offset parameter is used to inform the UE 3 and other neighbour cells about which resource (physical resource block) is available for RACH access. This parameter may also differ based on the tenant ID the UE 3 belongs to and/or slice type the UE 3 wants to use within a tenant ID so that different UEs belonging to different Tenant IDs (or using different slice types) can use different frequency resources for RACH access.

ra-ResponseWindowSize: The RA Response widow size parameter represents the duration of the random access response window in units of subframes (e.g. 2, 3, 4, 5, 6, 7, 8, or 10 subframes). This parameter may also differ for different tenant ID and/or slice type. Moreover, the earliest time when the network can transit RACH Response (i.e. the start of the RAR response window) can vary depending on the tenant ID/slice type to (e.g. to take account of the tenant ID/slice type based preamble). Typically the RAR response window would starts 3 subframes after the end of RACH preamble.

preambleTransMax: This parameter defines the maximum number of preambles transmissions (typical possible values are 3, 4, 5, 6, 7, 8, 10, 20, 50, 100, 200). This parameter may also differ for different tenant ID and/or slice type to allow for different numbers of transmission attempts for different tenants/slice types.

Similarly, the some parameters may, for example, be provided on a per tenant ID/per slice type basis in other messages of the RACH procedure. For example, the backoff indicator which is typically included in a media access control protocol data unit (MAC PDU) of the RAR, may differ for different tenant ID and/or slice type for the purposes of prioritisation. The backoff indicator is a special MAC subheader that carries the parameter indicating a time delay between subsequent RACH attempts.

It will be appreciated that other physical channels such as the physical downlink shared channel (PDSCH) and physical uplink shared channel (PUSCH) can be 'sliced' in a similar manner to allow prioritized handling of the RAR (message 2) and message 3 respectively.

It will also be appreciated that, in a similar way, other physical channels such as paging channel (PCH), physical downlink shared channel (PDSCH), physical downlink control channel (PDCCH), physical uplink control channel (PUCCH) may be 'sliced' for prioritised handling (albeit not related to RACH).

It will be appreciated that the RACH can include RRC message (like in UMTS) for easy tenant identification for priorisied treatment (e.g. in case preambles are not sliced).

FIG. 10 illustrates a procedure, that may be performed internally between a radio resource control layer, a medium access control layer, and a physical layer of user equipment of the telecommunications system of FIG. 1, when implementing the procedure of FIG. 9 or a similar procedure.

As seen in FIG. 10 the procedure begins at S1000 when the radio resource control (RRC) entity 247 in the UE 3 sends a request to the UE MAC entity 249 to trigger the RACH procedure.

At step S1002 the UE MAC entity 249 identifies, from the system information block and/or MDD/USIM configuration information, the correct subframe, preambles and other parameters (e.g. any of the parameters mentioned with reference to FIG. 9) for a given Tenant ID the UE 3 belongs to and/or Slice type the UE 3 intends to use.

The UE MAC entity 249 will then calculate, at S1004, an allowed preamble index, ra-RNTI and the power that will be used for preamble transmission. These values are instructed, at S1006, to UE PHY entity 251, along with the RACH subframe on which transmission of the RACH request has to be performed based on the Tenant ID of the tenant to which the UE 3 belongs, the Slice type, MDD, UE capabilities etc.

The UE PHY 251 then transmits RACH Request at S1008.

<Support for Connected-Mode Mobility>

FIGS. 11(a) to (e) illustrate a number of procedures, that may be performed between base stations of the type shown in the telecommunications system of FIG. 1, for supporting connected-mode mobility in the context of network slicing. More specifically, FIGS. 11(a) to (e) illustrate various Inter-gNB tenant ID and slice type resource information exchange procedures for supporting handover decision making FIGS. 11(a) and (b) illustrate procedures for allowing neighbouring gNBs 5 to know what Tenant IDs and slice types are supported by each neighbour gNB 5. FIGS. 11(c) to (e) illustrate procedures for allowing neighbouring gNBs 5 to know the load condition of each tenant and slice type (within tenant ID), TUPF of each neighbour gNB 5. It will be appreciated that these procedures may be implemented in isolation or any in technically appropriate combination.

FIG. 11(f) illustrates a procedure for initiating handover based on information exchanged in one or more of the procedures illustrated in FIGS. 11(a) to (e).

Referring to FIGS. 11(a) and (b), information for allowing a neighbouring gNBs 5 to know what Tenant IDs and slice types are supported by each neighbour gNB 5 may be exchanged at the time of interface establishment between neighbouring gNBs 5 and/or at the time of a configuration update between neighbouring gNBs.

As seen in FIG. 11(a), for example, at the time of a configuration update between neighbouring gNBs (A) and (B), gNB (A) sends, at S1100, an interface setup request message to gNB (B) in order to initiate the setup of a gNB to gNB interface (e.g. similar to an X2 interface) between gNB (A) and gNB (B). The interface setup request message includes information identifying the Tenant ID(s) and/or Slice type(s) (per Tennant ID) supported by gNB (A). gNB (B) responds, at S1102, with an appropriate interface setup response message. The interface setup response message includes information identifying the tenant ID(s) and/or slice type(s) (per tenant ID) supported by gNB (B).

As seen in FIG. 11(b), at the time of a configuration update between neighbouring gNBs (A) and (B), gNB (A) sends, at S1104, a gNB configuration update message to gNB (B) in order to update gNB (B) of changed support of tenant ID(s) and/or slice type(s) (per tenant ID). The gNB configuration update message includes information identifying the tenant ID(s) and/or slice type(s) (per tenant ID) now supported by gNB (A). gNB (B) responds, at S1106, with an appropriate gNB configuration update acknowledgement message to confirm safe receipt of the updated information.

Referring to FIGS. 11(c) to (e), information for allowing a neighbouring gNBs 5 to know the load condition of each tenant and slice type (within Tenant ID), TUPF of each neighbour gNB 5 may be exchanged at regular time intervals and/or when triggered for example in procedures such as a load indication procedure, a resource status reporting initiation procedure, an unsolicited resource status reporting procedure (similar to the X2AP resource status reporting procedure).

FIG. 11(c), for example, illustrates a load indication procedure in which gNB (A) sends, at S1108, a load information message to gNB (B) in order to inform gNB (B) of the load condition (e.g. UL/DL physical resource block usage) of each tenant ID, slice type (within tenant ID) and or TUPF associated with that gNB(A). The load information message may be a message that is sent at predefined regular intervals and/or when triggered by an event as appropriate.

FIG. 11(d) illustrates a resource status reporting initiation procedure in which gNB (A) sends, at S1110, a resource status request to gNB (B) in order to request gNB (B) to inform gNB (A) of its load condition. gNB (B) responds, at S1112, with a resource status request message in order to inform gNB (A) of the load condition (e.g. UL/DL physical resource block usage) of each tenant ID, slice type (within tenant ID) and or TUPF associated with that gNB(B).

FIG. 11(e) illustrates a resource status reporting procedure in which gNB (B) sends at regular intervals and/or when triggered to do so (e.g. by an event), e.g. at S1114, a resource status update message in order to update gNB (A) of the prevailing load condition (e.g. UL/DL physical resource block usage) of each tenant ID, slice type (within tenant ID) and or TUPF associated with that gNB (B).

Referring to FIG. 11(f), therefore, when a handover becomes necessary, a source gNB (e.g. gNB (A) in FIG. 11) can make a decision on handover and select a target gNB (e.g. gNB (B) in FIG. 11), as illustrated at S1116, based on any load information it has obtained from its neighbours (e.g. using one or more of the procedures illustrated in FIGS. 11(c) to (e)) for the tenant to which the UE 3 being handed over belongs and the slice type that it intends to use. The decision can also be based on knowledge obtained from its neighbours (e.g. using one or more of the procedures illustrated in FIGS. 11(a) and (b)) of the gNBs that support the tenant to which the UE 3 being handed over belongs and the slice type that it intends to use obtained.

In this example, therefore, when a decision has been made at S1116, gNB (A) then sends, at S1118, a handover request including the tenant ID and/or slice type and the target gNB (gNB (B) in this example) to gNB (B). gNB (B) responds, at S1120, with a handover response (or handover acknowledge) message (which will typically include the handover command to be sent to the UE 3 by the source gNB to initiate handover). The rest of the handover process may proceed in accordance with procedures that those skilled in the art will be familiar with and, for reasons of brevity, will not be described in detail.

FIG. 12 illustrates a procedure, that may be performed between user equipment and base stations of the type shown in the telecommunications system of FIG. 1, for supporting mobility in the context of network slicing.

As seen in FIG. 12, as an alternative to or in addition to one or more of the procedures shown in FIG. 11, a UE 3 can provide a source gNB with Information in terms of what a neighbouring (potential target) gNB can support using measurement reporting and then the source gNB can decide on the appropriate target gNB based on that information.

Specifically, in the Example of FIG. 12, a (source) gNB (A) configures the UE 3 to perform appropriate neighbour cell measurements for neighbour gNBs such as gNB (B) (and possibly the serving gNB) using an appropriate measurement control message sent at S1200. The UE 3 performs the configured measurements and also acquires the neighbour supported tenant ID(s) and/or slice type(s) (per tenant ID) at S1201. The acquired information may, for example, be obtained from system information broadcast in the neighbour cells as described with reference to FIG. 8. The UE 3 reports the measurements and the acquired information in at least one measurement report at S1202. With a help of the UE, it will be appreciated that this mechanism can enhance Automatic Neighbour Relation (ANR) for a gNB to know its neighbour gNB in terms of what tenant/slice types supported and build a Neighbour Relation Table (NRT) with these details.

gNB (A) then makes a decision on handover and selects a target gNB (e.g. gNB (B)), as illustrated at S1204, based on the measurement results and the tenant ID(s) and/or slice type(s) (per tenant ID) supported by the neighbour gNBs. When a decision has been made, gNB (A) then sends, at S1206, a handover request including the tenant ID and/or slice type and the target gNB (gNB (B) in this example) to gNB (B). gNB (B) responds, at S1208, with a handover response (or handover acknowledge) message (which will typically include the handover command to be sent to the UE 3 by the source gNB to initiate handover). The rest of the handover process may proceed (e.g. at S1210) in accordance with procedures that those skilled in the art will be familiar with and, for reasons of brevity, will not be described in detail.

<Handling Slice Overload Situations>

In nearly over-loaded situations, traffic has to be throttled back. A differentiation policy may be applied to throttle the traffic depending on tenant ID and/or slice type based on local operator policy. Whilst this it is up to the policy framework of a particular operator to determine what the best strategy is the following procedures provide signalling mechanisms that can be used to notify of overload/congestion situations.

FIG. 13 illustrates a procedure, that may be performed between user equipment and a base station of the type shown in the telecommunications system of FIG. 1, for facilitating the handling of congestion/overload situations in a gNB.

In the example of FIG. 13 the procedure is similar to that of access class barring (ACB). However, unlike ACB, the barring occurs on a per tenant ID and/or per slice identifier (e.g. a slice index) basis. As seen in FIG. 13, the procedure begins with the gNB 5 setting (or changing) access barring parameters on a per tenant ID and/or per slice index basis. The access baring parameters may include, for example, a barring factor and/or barring time per tenant ID/slice index. A barring factor is a parameter that is used by the UE 3 to determine whether or not access to a particular cell is, in effect, barred. Specifically, the barring factor (or 'access probability') determines the probability that access is allowed. If a UE-generated random number n is equal to the factor (or 'probability') the access is considered barred for a mean access barring time duration corresponding to the barring time.

In the procedure of FIG. 13, when the gNB 5 next broadcasts system information at S1304, the system information includes a system information block (e.g. SIB2) that is configured to include information identifying the barring parameters on a per tenant IDs and or slice index basis.

As seen at S1302, the UE 3 listens for the regular broadcasts of system information provided from the gNB 5 and, accordingly, when the gNB 5 provides, at S1304, the system information broadcast, the UE 3 receives the system information block including the information identifying the barring parameters on a per tenant IDs and or slice index basis.

It will be appreciated that whilst shown at a particular point in the procedure illustrated in FIG. 13, a UE 3 listening for system information will be an ongoing process that the UE 3 will continue to do regularly whilst it is switched on.

After receipt of the information identifying the barring parameters on a per tenant IDs and or slice index basis the UE 3 applies, at S1306, access barring parameters for the tenant to which it belongs, and/or the index of the slice it intends to use, when deciding whether to attempt access via gNB/NR-BS.

FIG. 14 illustrates another procedure, that may be performed between a base station and a core network function of the type shown in the telecommunications system of FIG. 1, for facilitating the handling of congestion/overload situations in a gNB 5.

In the example of FIG. 14 the procedure is similar to that of core network controlled overload start and stop procedures access class barring (ACB). However, unlike existing core overload control procedures, the overload control is handled on a per tenant ID and/or per slice identifier (e.g. a slice index) basis.

As seen in FIG. 14, the procedure begins at S1400 when a core network function (e.g. mobility management function 7-3) detects an overload situation and decides on an appropriate form of overload action on a per tenant and/or per slice basis. The core network function 7-3 generates and sends, at S1401, an appropriate overload start message to the affected gNB(s) 5. The overload start message includes respective overload parameters for each tenant ID and/or slice index. The parameter may include, for example, overload response parameters and/or traffic load reduction indications on a per tenant ID and/or slice Index basis.

The gNB 5 receiving the overload start message as S1401 responds by reducing, at S1402, signalling load towards the concerned core network function 7-3. This may be achieved by, for example, rejecting, permitting and/or restricting RRC Connection Establishment based on the respective overload parameters for each tenant ID and/or slice Indexes.

When at S1403 when the core network function 7-3 detects the end of the overload situation it generates and sends, at S1403, an appropriate overload stop message to the affected gNB(s) 5.

The gNB 5 receiving the overload stop message as S1403 responds by resuming normal operation towards the concerned core network function.

It will be appreciated that RRC Reject, RRC Release, pre-emption, and access class barring procedures can all be employed (e.g. on a per tenant and/or per slice basis), in the event of overload/congestion, to help control traffic. Moreover, it will be appreciated that an overload can happen due to a node failure or traffic increase.

<Tenant Usage Monitoring>

FIG. 15 illustrates a procedure, that may be performed in the telecommunications system of FIG. 1, for facilitating provision of tenant usage (e.g. per slice type) specific functions such as charging.

As seen in FIG. 15, when one or more UEs 3 are communicating via gNB 5 in the uplink and/or downlink (as illustrated at S1500), the gNB 5 uses dedicated counters to monitor downlink and uplink data for each UE per slice type used at S1502. For data usage accumulation purposes, each UE can be identified, at a high-level, based on its tenant ID and hence the data usage can be aggregated for UEs 3 having the same tenant ID to produce tenant specific aggregated DL and UL data volumes for each tenant ID and/or per slice type (for each tenant ID). The gNB 5 generates data volume reports comprising the aggregated DL and UL data volumes and sends them to a core network function (e.g. a policy and charging function 7-4) at S1504.

The core network function 7-4 calculates, at S1506, tenant and/or slice type specific aggregated (accumulated) downlink and uplink data usage for multiple gNBs 5 based on the information provided in the respective data volume reports received from each gNB 5.

The core network function 7-4 then performs, at S1508, tenant specific usage functions such as charging based on results of the calculations performed at S1506.

Where non-3GPP radio access technologies (e.g., IEEE 802.11, IEEE 802.15) are supported in a seamless way the data volume calculations can beneficially also be performed on a per radio access technology for differentiated RAT based charging. Where unlicensed spectrum is used with License Assisted Access (LAA), this information may also be considered.

<Dynamic Functional Splits>

FIG. 16 illustrates a number of different options for functional splits between a distributed unit and a central unit of a distributed base station of the type shown in the telecommunications system of FIG. 1 and described with reference to FIG. 4. The options include:

<Option 1>
According to the Option 1 functional split, functions of the radio resource control (RRC) layer are performed in the central unit. Functions of the Packet Data Convergence Protocol (PDCP), Radio Link Control (RLC), Media Access Control (MAC) and physical (PHY) layers and radio frequency (RF) functions are performed in the distributed unit.

<Option 2>
According to the Option 2 functional split, functions of the RRC and PDCP layers are in the central unit. Functions of the RLC, MAC, physical layer and RF are in the distributed unit.

<Option 3>
According to the Option 3 functional split, functions of the RRC, PDCP and high RLC layers (i.e. partial functions of RLC) are in the central unit. Functions of the low RLC layers (i.e. other partial functions of the RLC layer), MAC layer, physical layer and RF are in the distributed unit.

<Option 4>
According to the Option 4 functional split, functions of the RRC, PDCP and RLC layers are in the central unit. Functions of the MAC, physical layer and RF are in distributed unit.

<Option 5>
According to the Option 5 functional split, functions of the RRC, PDCP, RLC and higher MAC layers are in the central unit. Functions of the lower MAC layers (e.g. Hybrid automatic repeat request (HARQ)), the physical layer and RF are in the distributed unit.

<Option 6>
According to the Option 6 functional split, functions of the RRC, PDCP, RLC and MAC layers are in the central unit. Functions of the physical layer and RF are in the distributed unit.

<Option 7>
According to the Option 7 functional split, functions of the RRC, PDCP, RLC, MAC and (an upper) part of the Physical layer are in the central unit. Functions of (a lower) part of the physical layer and RF are in the distributed unit.

<Option 8>
According to the Option 8 functional split, functions of the RRC, PDCP, RLC, MAC and Physical layer are in the central unit. Functions of RF are in the distributed unit.

It will be appreciated that the options represented comprise a non-exhaustive list.

It will be appreciated that none of the above options for a functional split between a central unit and distributed unit are optimal in all scenarios not least because channel conditions, load conditions and quality of service requirements may vary.

FIGS. 17 and 18 each describe a procedure that may be used to improve the flexibility of base stations having such functional splits by allowing the functional split to be changed dynamically, for example to optimise the functional split based on channel conditions, load conditions and quality of service requirements may vary and/or the like. In each of these procedures each of the different options for functional splits described with reference to FIG. 16 (or at least each of a subset of these options) is provided with a respective identifier (e.g. an index number). When a UE service request is established, the central unit of a distributed gNB 5-2 (FIG. 17), or a core node function 7-5 (FIG. 18) will determine what functional split option is to be used and provide an associated indication for setting up an appropriate functional split between the central and distributed unit.

It will be appreciated that these procedures may be implemented in isolation or combination (e.g. as different options in the telecommunication system 1).

FIG. 17 illustrates a procedure, that may be performed in the telecommunications system of FIG. 1, for facilitating dynamic configuration of a functional split between a distributed unit and a central unit of a distributed base station of the type shown in the telecommunications system of FIG. 1.

In the example of FIG. 17, the procedure begins when a service request is sent, at S1700, from a UE 3 to a distributed gNB 5-2. The service request will typically include information identifying the UE 3, the tenant to which the UE 3 belongs and/or the slice it wants to use. The distributed unite 5-2a of the gNB 5-2 receives the service request and forwards it, at S1702, to the central unit 5-2b of the gNB 5-2.

In this example, the central unit 5-2b decides, at S1704, on the optimum functional split for the identified UE 3, the tenant to which the UE 3 belongs and/or the slice the UE 3 wants to use. This decision will typically take account of prevailing channel conditions, load conditions and/or quality of service requirements.

When a decision on the optimum functional split has been made, the central unit 5-2b provides an indication of the functional split to the distributed unit 5-2a at S1705 and the distributed and central units configure (or reconfigure) the functional split for that UE 3, tenant ID and/or slice at S1706.

At S1708, the service request is forwarded to an appropriate function in the core network 7. This may be as part of an initial UE message or the like. The core network function 7 responds by sending a request for the setup of a UE context (e.g. an initial context setup request) to the gNB 5-2 at S1710. When the context is setup appropriately at the gNB 5-2, the central unit 5-2b of the gNB 5-2 sends an appropriate response (e.g. an initial context setup response) to the core network function 7 to confirm the setup of a UE context. It will be appreciated that these messages, and the associated setup of the UE context, may occur earlier in the process, for example before or in parallel with the decision on the functional split and associated reconfiguration.

The procedures continues, at S1714, with appropriate bearer establishment/modification with which those skilled in the art will be familiar and which, for reasons of brevity, will not be described in detail here.

FIG. 18 illustrates another procedure, that may be performed in the telecommunications system of FIG. 1, for facilitating dynamic configuration of a functional split between a distributed unit and a central unit of a distributed base station of the type shown in the telecommunications system of FIG. 1.

Like the procedure of FIG. 17, in the example of FIG. 18, the procedure begins when a service request is sent, at S1800, from a UE 3 to a distributed gNB 5-2. The service request will typically include information identifying the UE 3, the tenant to which the UE 3 belongs and/or the slice it wants to use. The distributed unite 5-2a of the gNB 5-2 receives the service request and forwards it, at S1802, to the central unit 5-2b of the gNB 5-2.

In this example, however, at S1804, the service request is forwarded to the core network. This may be as part of an initial UE message or the like. An appropriate core network function (e.g. the distributed gNB control function 7-5 or a core network function that includes such a function) decides, at S1806, on the optimum functional split for the identified UE 3, the tenant to which the UE 3 belongs and/or the slice the UE 3 wants to use. This decision will typically take account of prevailing channel conditions, load conditions and/or quality of service requirements.

The core network sends a request for the setup of a UE context (e.g. an initial context setup request) to the gNB 5-2 at S1808 including an indication of the functional split to the central unit 5-2b of gNB 5-2. The central unit 5-2b provides an indication of the functional split to the distributed unit 5-2a at S1809 and the distributed and central units configure (or reconfigure) the functional split for that UE 3, tenant ID and/or slice at S1810.

When the context is setup appropriately at the gNB 5-2, the central unit 5-2b of the gNB 5-2 sends an appropriate message (e.g. an initial context setup response) to the core network to confirm the setup of a UE context. It will be appreciated that this message, and the associated setup of the UE context, may occur earlier in the process, for example before or in parallel with the notification and (re)configuration of the functional split.

The procedures continues, at S1814, with appropriate bearer establishment/modification with which those skilled in the art will be familiar and which, for reasons of brevity, will not be described in detail here.

Modifications and Alternatives

A number of detailed example embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above example embodiments, a number of software modules were described for implementing the user equipment, base stations and/or core network functions and the like. As those skilled will appreciate, such software modules may be provided in compiled or un-compiled form and may be supplied to the corresponding hardware as a signal over a computer network, or on a recording medium. Further, the functionality performed by part or all of this software may be performed using one or more dedicated hardware circuits. However, the use of software modules is preferred as it facilitates the updating of the corresponding hardware in order to update its functionality. Similarly, although the above example embodiments employed transceiver circuit, at least some of the functionality of the transceiver circuit can be performed by software.

For example, whilst the functions of the core network are described as being logical functions it will be appreciated that they may be implemented using one or computer processing apparatus having one or more hardware computer processors programmed using appropriate software instructions to provide the required logical functions (e.g. one or more computer processors forming part of the controllers described with reference to FIGS. 5 to 7). It will be further appreciated that all or part of these functions may be implemented in hardware as dedicated circuitry for example using one or more dedicated integrated circuits such as an application specific integrated circuit (ASIC) or the like.

Similarly, the functionality of the user equipment and base stations (gNBs) will typically be implemented using one or computer processing apparatus having one or more hardware computer processors programmed using appropriate software instructions to provide the required functionality (e.g. one or more computer processors forming part of the controllers described with reference to FIGS. 2, 3 and 4). It will be further appreciated that all or part of this functionality may be implemented in hardware as dedicated circuitry for example using one or more dedicated integrated circuits such as an application specific integrated circuit (ASIC) or the like.

It will be appreciated that the controllers referred to in the description of the UE, gNBs and core network nodes/functions (i.e. with reference to FIGS. 2 to 7) may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

It will also be appreciated that whilst procedures are described for modifying the functional split dynamically based on channel conditions, required quality of service etc., the functional split could be static with different functional split options preconfigured for different tenant ID and/or slice types within a given tenant ID. Moreover, whilst an initial context setup request is described, by way of example only, for providing the functional split indication, anything equivalent can be used for this purpose. It will also be appreciated that the indication may be notified at the time of slice index selection, this can be notified (e.g. equivalent to the S1AP Initial Context Setup Request) so that a user plane slice will be selected with an appropriate functional split between the CU and DU.

It will be appreciated that whilst FIG. 1 shows what appears to be a whole network slice, the core can have its own slice and so can a radio access network RAN. Similarly the control plane (CP) and user plane (UP) can have different slices altogether. Different mapping of RAN Slices to Core Slices can happen depending on standardisation and cellular operator policy.

It will also be appreciated that the tenant may be a wholesale customer such as a mobile virtual network operator (MVNO), or mobile other licensed operator (MOLO), who is a wireless communications services provider that does not own the wireless network infrastructure over which the MVNO provides services to its customers.

However, tenants need not necessarily be an MVNO. Tenants can be corporate customers like multinational companies, a vehicle fleet, emergency services, security services (e.g. security companies). Each tenant may have different requirements in terms of what slice type(s) they use based on service level agreements. With the concept of tenants, mobile network operator can now differentiate different customer requirements and provide customised services using one or many slices.

It will be appreciated that whilst different apparatus are described as having transceiver circuitry for the purposes of communicating (i.e. transmitting/receiving) data to and from other apparatus/devices, transceiver functionality may also be implemented in software, run on a corresponding hardware controller, for communicating messages and/or information between different respective functions that are co-located on the same physical apparatus.

It will be appreciated that, alternatively or additionally, the TUPF(s) or at least one additional TUPF(s) can be co-located with the access network (e.g. to enable stationary UE scenarios).

It will be appreciated that instead of the term 'tenant' the term 'participating operator' may also be used.

In the above example embodiments, a telecommunications system operating according to 3GPP standards was described. However, as those skilled in the art will appreciate, the techniques described in the present application can be employed in communications systems operating according to other standards, in particular any Orthogonal Frequency-Division Multiplexing (OFDM)-based system, such as the Worldwide Interoperability for Microwave Access (WiMAX) standard.

In the above examples, a mobile telephone based telecommunications system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, and the like.

It can be seen therefore that the above description describes an example of a communication device for a communication system in which network slicing is supported and in which at least one tenant is able to communicate using at least one slice type associated with that tenant, the communication device comprising: a controller and a transceiver; wherein the transceiver is configured to receive network slicing related information transmitted by a base station, wherein the network slicing related information comprises at least one of: (i) information identifying support for at least one of: a tenant whose communication is supported via the base station, and a network slice type of a tenant that is supported by the base station; (ii) information comprising at least one communication parameter that is associated with at least one of: a specific tenant, and a specific slice type of a specific tenant; and wherein the controller is configured to control communication, via the transceiver, using a slice having a slice type of a tenant with which the communication device is associated, based on information provided in the received network slicing related information that relates specifically to at least one of: the tenant with which the communication device is associated, and the slice type of the tenant with which the communication device is associated.

As indicated above, the network slicing related information may comprise information identifying at least one of: a tenant whose communication is supported via the base station, and a network slice type of a tenant that is supported by the base station. The controller may be configured to determine, based on the information identifying support provided in the received network slicing related information, whether to camp on the cell based on at least one of: whether the base station supports the tenant with which the communication device is associated, and whether the base station supports the slice type of the tenant with which the communication device is associated.

As indicated above, the network slicing related information may comprise information comprising at least one communication parameter that is associated with at least one of: a specific tenant, and a specific slice type of a specific tenant.

The at least one communication parameter may comprise at least one parameter identifying at least one random access channel (RACH) preamble that is specific to at least one of: a specific tenant, and a specific slice type of a specific tenant. The controller may be configured: to select, based on the at least one parameter identifying at least one random access channel (RACH) preamble provided in the received network slicing related information, a RACH preamble specific to at least one of: the tenant with which the communication device is associated; and the slice type of the tenant with which the communication device is associated; and may initiate a RACH procedure in which the selected RACH preamble is sent to the base station.

The at least one communication parameter may comprise at least one of: a parameter representing a target power level for the base station to receive a first transmission of a radio access channel (RACH) request at (e.g. a tenant/slice type specific PreambleInitialReceivedTargetPower); a parameter representing a power increment to be used by the communication device when transmitting repetitions of a RACH request (e.g. a tenant/slice type specific PowerRamping-Step); a parameter representing when the communication device should send a RACH (e.g. a tenant/slice type specific prachConfigIndex); a parameter representing a frequency resource (e.g. a physical resource block) that is available for RACH access (e.g. a tenant/slice type specific prachFreqOffset); and a parameter representing a duration of a random access response window (e.g. a tenant/slice type specific ra-ResponseWindowSize).

The at least one communication parameter may comprise at least one access barring parameter and the controller may be configured to control communication based on the at least one access barring parameter.

The network slicing related information may be received in system information (e.g. a system information block (SIB) e.g. SIB2) broadcast by the base station.

It can be seen therefore that the above description describes an example of a base station for a communication system in which network slicing is supported and in which at least one tenant is able to communicate using at least one slice type associated with that tenant, the base station comprising: a controller and a transceiver; wherein the controller is configured to generate network slicing related information for transmission by the transceiver, wherein the network slicing related information for transmission comprises at least one of: (i) information identifying support for at least one of: a tenant whose communication is supported via the base station, and a network slice type of a tenant that is supported by the base station; (ii) information comprising at least one communication parameter that is associated with at least one of: a specific tenant, and a specific slice type of a specific tenant; and wherein the transceiver is configured to transmit the network slicing related information generated by the controller to at least one of a further base station and a communication device.

As indicated above, the network slicing related information may comprise information comprising at least one communication parameter that is associated with at least one of: a specific tenant, and a specific slice type of a specific tenant.

The at least one communication parameter may comprise at least one parameter identifying at least one random access channel (RACH) preamble that is specific to at least one of: a specific tenant, and a specific slice type of a specific tenant. The transceiver may be configured to receive, from a communication device, a RACH preamble that is specific to at least one of: a specific tenant, and a specific slice type of a specific tenant. The controller may be configured to prioritise, based on the received RACH preamble, communication of the at least one of: a specific tenant, and a specific slice type of a specific tenant.

The network slicing related information may comprise at least one communication parameter identifying a load and/or congestion condition for at least one of: a specific tenant, and specific slice of a specific tenant. The transceiver may be configured to transmit the communication parameter identifying a load and/or congestion condition for at least one of: a specific tenant, and specific slice of a specific tenant, to at least one further base station over a base station to base station interface (e.g. as part of at least one of: a resource status reporting procedure; a resource status reporting initiation procedure; and a load indication procedure).

The at least one communication parameter may comprise at least one access barring parameter and wherein the controller is operable to control communication based on the at least one access barring parameter.

As indicated above, the network slicing related information may comprise information identifying at least one of: a tenant whose communication is supported via the base station, and a network slice type of a tenant that is supported by the base station. The transceiver may be configured to transmit the information identifying at least one of: a tenant whose communication is supported via the base station, and a network slice type of a tenant that is supported by the base station, to another base station over a base station to base station interface (e.g. as part of at least one of: an interface establishment procedure with another base station; and a configuration update procedure).

The transceiver may be configured to receive from, at least one further base station, network slicing related information comprising at least one of: information identifying support, by the at least one further base station, for at least one of: (i) a tenant whose communication is supported via the base station, and a network slice type of a tenant that is supported by the base station; and (ii) information comprising at least one communication parameter that is associated with at least one of: a specific tenant, and a specific slice type of a specific tenant; and the controller may be operable to determine a target for handover based on the received network slicing related information.

It can be seen therefore that the above description describes an example of a base station for a communication system in which network slicing is supported and in which at least one tenant is able to communicate using at least one slice type associated with that tenant, the base station comprising: a controller and a transceiver; wherein the controller is configured to acquire data usage information for communication via the base station wherein the data usage information comprises separate respective data usage information for at least one of: each tenant for which communication via the base station occurs, and each network slice type of each tenant for which communication via the base station occurs; and wherein the transceiver is configured to provide, to a core node, the acquired separate respective data usage information.

The controller may be further operable to acquire data usage information for communication via the base station wherein the data usage information further comprises separate respective data usage information for at least one of: each radio access technology used for communication via the base station; each of frequency (or frequency band) used for communication via the base station; each technology used for communication via the base station; uplink communication; and downlink communication.

It can be seen therefore that the above description describes an example of base station apparatus for a communication system in which network slicing is supported and in which at least one tenant is able to communicate using at least one slice type associated with that tenant, the base station apparatus comprising: a distributed unit and a central unit, wherein each unit respectively comprises a controller and a transceiver; wherein the controller of the distributed unit is configured to provide lower layer functionality of the base station apparatus, relative to the central unit, and the controller of the central unit is configured to provide higher layer functionality of the base station apparatus, relative to the distributed unit; wherein there are a plurality of possible functional splits between the lower layer functionality provided by the distributed unit and the higher layer functionality provided by the central unit; and wherein the controller of the distributed unit and the controller of the central unit are configured to reconfigure dynamically the functional split between the lower layer functionality provided by the distributed unit and the higher layer functionality provided by the central unit from a first of the possible functional splits to a second of the possible functional splits.

The controller of the central unit may be configured to determine which of the possible functional splits should be used, and wherein the controller of the distributed unit and the controller of the central unit are configured to reconfigure the functional split in accordance with a determination of the functional split that should be used by the controller of the central unit. The controller of the central unit may be configured to determine which of the possible functional splits should be used based on at least one of: a channel condition, quality of service requirement, an identity of a communication device being served, an identity of a slice to be used for communication, and an identity of a tenant for which communication is to occur via the base station. The controller of the distributed unit and the controller of the central unit may be configured to reconfigure the functional split in accordance with a determination of the functional split that should be used by a core node.

Various other modifications will be apparent to those skilled in the art and will not be described in further detail here.

This application is based upon and claims the benefit of priority from United Kingdom patent application No. 1613899.2, filed on Aug. 12, 2016, the disclosure of which is incorporated herein its entirety by reference.

The invention claimed is:

1. A radio access network (RAN) node configured to communicate with a neighbouring RAN node in a procedure to exchange information between the RAN node and the neighbouring RAN node, the RAN node comprising:
   a controller configured to generate network slicing related information, wherein the network slicing related information comprises information identifying at least one slice type for at least one tenant of a network; and
   a transceiver configured to transmit, to the neighbouring RAN node, a RAN node to RAN node interface setup request message which includes the information identifying the at least one slice type for the at least one tenant of the network.

2. The RAN node according to claim 1,
   wherein the RAN node further comprises a receiver configured to receive, from the neighbouring RAN node, a RAN node to RAN node interface response message in response to the setup message.

3. A method for a RAN node configured to communicate with a neighbouring RAN node in a procedure to exchange information between the RAN node and the neighbouring RAN node, the method comprising:
   generating network slicing related information, wherein the network slicing related information comprises information identifying at least one slice type for at least one tenant of a network; and transmitting, to the neighbouring RAN node, a RAN node to RAN node interface setup request message which includes the information identifying the at least one slice type for the at least one tenant of the network.

4. The method according to claim 3, further comprising:
   receiving, from the neighbouring RAN node, a response message in response to the setup message.

* * * * *